US008578483B2

(12) United States Patent
Seshadri et al.

(10) Patent No.: US 8,578,483 B2
(45) Date of Patent: Nov. 5, 2013

(54) SYSTEMS AND METHODS FOR PREVENTING UNAUTHORIZED MODIFICATION OF AN OPERATING SYSTEM

(75) Inventors: Arvind Seshadri, Pittsburgh, PA (US); Ning Qu, Pittsburgh, PA (US); Adrian Perrig, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 769 days.

(21) Appl. No.: 12/221,109

(22) Filed: Jul. 31, 2008

(65) Prior Publication Data
US 2010/0031360 A1    Feb. 4, 2010

(51) Int. Cl.
*G06F 21/00* (2013.01)

(52) U.S. Cl.
USPC .......................................................... 726/22

(58) Field of Classification Search
None
See application file for complete search history.

(56) References Cited

U.S. PATENT DOCUMENTS

| 7,003,771 | B1 * | 2/2006 | Arndt ............................ 718/104 |
| 7,308,576 | B2 | 12/2007 | Glew et al. |
| 7,310,721 | B2 | 12/2007 | Cohen |
| 7,380,049 | B2 | 5/2008 | Rajagopal et al. |
| 7,401,230 | B2 | 7/2008 | Campbell et al. |
| 7,426,644 | B1 | 9/2008 | Strongin et al. |
| 7,818,808 | B1 * | 10/2010 | Neiger et al. ................... 726/26 |
| 7,865,893 | B1 * | 1/2011 | Omelyanchuk et al. .......... 718/1 |
| 2007/0028244 | A1 * | 2/2007 | Landis et al. ................. 718/108 |
| 2007/0061441 | A1 * | 3/2007 | Landis et al. ................. 709/224 |
| 2008/0092145 | A1 * | 4/2008 | Sun et al. ...................... 719/312 |
| 2008/0127348 | A1 * | 5/2008 | Largman et al. ................ 726/24 |
| 2008/0148064 | A1 * | 6/2008 | Challener et al. ............. 713/189 |

OTHER PUBLICATIONS

Becher, M., Dornseif, M., Klein, C.N.; FireWire all your memory are belong to us; Proceedings of CanSecWest; 2005.
Chen, S., Xu, J., Sezer, E.C., Gauriar, P., Iyer, R.K.; Non-control-data attacks are realistic threats; Proceedings of the 14th USENIX Security Symposium; pp. 177-192; Aug. 2005.
Chen, Xiaoxin, Garfinkel, Tal, Lewis, E. Christopher, Subrahmanyam, Pratap, Waldspurger, Carl, Boneh, Dan, Dwoskin, Jeffrey, Ports, Dan R.K.; Overshadow: A virtualization-based approach to retrofitting protection in commodity operating systems; Proceedings of the 13th Int'l Conference on ASPLOS; Mar. 2008.
Chuvakin, A.; Ups and downs of UNIX/Linux host-based security solutions; login: The Magazine of USENIX and SAGE; 28(2); Apr. 2003.
Criswell, J., Lenharth, A., Dhurjati, D., Adve, V.; Secure virtual architecture: A safe execution environment for commodity operating systems; Proceedings of ACM Symposium on Operating Systems Principles; Oct. 2007.
Dyer, J., Lindemann, M., Perez, R., Sailer, R., Van Doorn, L., Smith, S.W., Weingart, S.; Building the IBM 4758 Secure Coprocessor; IEEE Computer; 34(10):57-66; 2001.

(Continued)

*Primary Examiner* — Shaun Gregory
(74) *Attorney, Agent, or Firm* — Jones Day

(57) ABSTRACT

Systems and methods are provided for preventing unauthorized modification of an operating system. The system includes an operating system comprised of kernel code for controlling access to operation of a processing unit. The system further includes an enforcement agent executing at a higher privilege than the kernel code such that any changes to the kernel code are approved by the enforcement agent prior to execution.

33 Claims, 19 Drawing Sheets

(56) References Cited

OTHER PUBLICATIONS

Garfinkel, T., Pfaff, B., Chow, J., Rosenblum, M., Boneh, D.; Terra: A virtual machine-based platform for trusted computing; Proceedings of ACM SOSP; 2003.

Garfinkel, T., Rosenblum, M.; A virtual machine introspection based architecture for intrusion detection; Proc. Network and Distributed Systems Security Symposium; Feb. 2003.

Jones, K.J.; Loadable Kernel Modules; login: The Magazine of USENIX and SAGE; 26(7); Nov. 2001.

Kiriansky, V., Bruening, D., Amarasinghe, S.; Secure execution via program shepherding; Proceedings of the 11th USENIX Security Symposium; Aug. 2002.

Litty, Lionel, Lagar-Cavilla, Andres, Lie, David; Hypervisor Support for Identifying Covertly Executing Binaries; 17th USENIX Security Symposium; pp. 243-258, Jul. 2008.

Minnich, R., Hendricks, J., Webster, D.; The Linux BIOS; Proceedings of the 4th Annual Linux Showcase and Conference; Oct. 2000.

Rutkowska, J.; Beyond the CPU: Defeating hardware based RAM acquisition; Proceedings of BlackHat DC 2007; Feb. 2007.

Seshadri, A., Luk, M., Shi, E., Perrig, A., Van Doorn, L., Khosla, P.; Pioneer: Verifying integrity and guaranteeing execution of code on legacy platforms; Proceedings of ACM SOSP; pp. 1-15; Oct. 2005.

Shacham, H.; The geometry of innocent flesh on the bone: Return-info-libc without function calls (on the x86); Proceedings of the 14th ACM Conference on Computer and Communications Security; Oct. 2007.

Smith, S.W., Weingart, S.H.; Building a high-performance, programmable secure coprocessor; Computer Networks (Special Issue on Computer Network Security); 31:831-960; 1999.

Von Neumann, J.; First draft of a report on the EDVAC; In B. Randall, editor, The origins of digital computers: selected papers; pp. 383-392; 1982.

Wang, Y., Roussev, R., Verbowski, C., Johnson, A., Ladd, D.; AskStrider: What has changed on my machine lately?; Technical Report MSR-TR-2004-03; Microsoft Research; 2004.

Wang, Y., Vo, B., Roussev, R., Verbowski, C., Johnson, A.; Strider GhostBuster: Why it's a bad idea for stealth software to hide files; Technical Reports MSR-TR-2004-71; Microsoft Research; 2004.

Wurster, G., Van Oorschot, P., Somayaji, A.; A generic attack on checksumming-based software tamper resistance; Proceedings of IEEE Symposium on Security and Privacy; May 2005.

Yang, Jisoo, Shin, Kang; Using Hypervisor to Provide Data Secrecy for User Applications on a Per-Page Basis; Proceedings of the ACM VEE; Mar. 2008.

* cited by examiner

|  | Debug | Initialization | | | | Header Files | | Runtime | | | | | |
| --- | --- | --- | --- | --- | --- | --- | --- | --- | --- | --- | --- | --- | --- |
|  |  | SPT | | NPI | | Code | Declarations | SPT | | NPI | | SHA-1 | Module Reloc |
| Lines of code | 469 | C Asm | 558 130 | C Asm | 599 130 | 376 | 922 | C Asm | 1236 46 | C Asm | 609 46 | 294 | 81 |

Fig. 13

| Host | Null Call | Fork | Exec | Prot Fault | PF |
|---|---|---|---|---|---|
| Linux (UP) | 0.10 | 139 | 410 | 0.248 | 1.71 |
| Xen (UP) | 0.17 | 415 | 1047 | 0.565 | 3.71 |
| SecVisor | 25.6 | 2274 | 6203 | 27.3 | 35.1 |

Fig. 14

| Source | Null Call | Fork | Exec | Prot Fault | PF |
|---|---|---|---|---|---|
| SPT | 0.10 | 1275 | 3043 | 2.289 | 14.6 |
| SPT – Perm | 21.8 | 2148 | 5816 | 22.5 | 32.9 |

Fig. 15

| Host | 2p/0K | 2p/16K | 2p/64K | 8p/16K | 8p/64K |
|---|---|---|---|---|---|
| Linux (UP) | 0.56 | 0.64 | 3.19 | 1.48 | 12.9 |
| Xen (UP) | 2.61 | 2.42 | 5.16 | 4.07 | 17.1 |
| SecVisor | 54.3 | 52.7 | 53.6 | 63.3 | 75.8 |

Fig. 16

SYSTEMS AND METHODS FOR PREVENTING UNAUTHORIZED MODIFICATION OF AN OPERATING SYSTEM

BACKGROUND

This disclosure relates generally to operating system security and more particularly to maintenance of kernel code integrity.

Computing platforms are steadily increasing in complexity, incorporating an ever-growing range of hardware and supporting an ever-growing range of applications. Consequently, the complexity of the central component of the computer operating system ("OS"), also known as the kernel, is steadily increasing.

The increased complexity of OS kernels also increases the number of security vulnerabilities. The effect of these vulnerabilities is compounded by the fact that, despite many efforts to make kernels modular, most kernels in common use today are monolithic in their design. A compromise of any part of a monolithic kernel could compromise the entire kernel. Because the kernel occupies a privileged position in the software stack of a computer system, compromising the kernel gives the attacker complete control of the system.

In view of the importance of the security of the kernel to the security of a system, a need exists for an agent that can maintain the integrity of existing kernels. Agents that do not mandate large-scale design changes to existing kernels are preferable, because such agents will ease deployment.

SUMMARY

One embodiment of the present disclosure is directed to a system for preventing unauthorized modification of an operating system. The system is comprised of a processing unit, a system memory in communication with the processing unit, and an operating system for controlling the operation of the processing unit. The operating system is comprised of kernel code. The system further comprises an enforcement agent executing at a higher privilege level than the privilege level of the kernel code such that any changes to the kernel code are approved by the enforcement agent.

Another aspect of the present disclosure is directed to an enforcement agent for monitoring the operating system code such that any changes to the operating system code must be approved by the enforcement agent prior to execution thereby protecting the integrity of the operating system code.

Another aspect of the present disclosure is directed to a method of protecting a computer which operates in a user mode and a higher privilege operating system mode, the method comprising requiring that all entries into the higher privilege operating system mode begin with the execution of approved operating system instructions, executing only approved operating system instructions while in the higher privilege operating system mode, switching to user mode before running non-approved instructions, and preventing unauthorized modification of approved instructions.

Another aspect of the present invention is directed to a method of maintaining kernel code integrity in an operating system, the method comprising detecting a request that an execution mode be changed to kernel mode at an address, determining whether the address is within approved kernel code, setting the execution mode to kernel mode if the address is within approved kernel code, setting an instruction pointer to the address if the address is within approved kernel code, executing instructions in kernel mode as long as the instruction pointer remains within approved kernel code, detecting a request that the execution mode be changed to user mode, and setting the execution mode to user mode upon detection of a request that the execution mode be changed to user mode.

Another aspect of the present disclosure is directed to a method of ensuring that all CPU control transfer targets are within approved code, the method comprising compiling a list of entry pointers containing pointer addresses associated with all control transfer events to kernel mode for an architecture, detecting a request for a CPU control transfer to kernel mode at a target address, and ensuring that the target address appears on the list of entry pointers before permitting the CPU control transfer.

A further aspect of the present invention is directed to a method of detecting CPU control transfer requests comprising initializing a system in kernel mode such that a portion of kernel code permissions are set to execute and non-write and all non-kernel code permissions are set to non-execute, detecting a first execution permission exception generated by an attempt to execute non-kernel code marked with non-execute permissions, modifying all kernel code permissions to non-execute, and modifying a portion of the non-kernel code permissions to execute.

A further aspect of the present disclosure is directed to a method of initializing a secured operating system comprising initializing the Basic Input and Output System (BIOS), initializing a monitor program following initialization of BIOS utilizing a late launch capability such that a CPU executes the monitor program code in isolation from all entities other than the CPU, a memory controller, and memory, verifying the integrity of the monitor program, initializing operating system code at a lower privilege level than the monitoring program, identifying a portion of the operating system code as having execute permission, and identifying all other memory as having non-execute permission.

The disclosed monitoring program, which may interchangeably be referred to as an enforcement agent or SecVisor provides a lifetime guarantee of the integrity of the code executing with kernel privilege. In other words, the monitoring program prevents an attacker from either modifying existing code in a kernel or from executing injected code with kernel privilege, over the lifetime of the system. The disclosed monitoring system can achieve this guarantee even in the presence of an attacker who controls everything on the system except for the central processing unit (CPU), memory controller, and system memory. The monitoring program ensures that only code approved by the user can execute with kernel privilege. Users can supply their desired approval policy and the monitoring program checks all code loaded into the kernel against the users' approval policy. It further ensures that the approved code currently in memory cannot be modified by the attacker.

The disclosed monitoring program may prevent numerous attacks against current kernels. For example, there are at least three ways in which an attacker can inject code into a kernel. First, the attacker can misuse the modularization support that is part of many current kernels. Modularization support allows privileged users to add code to the running kernel. An attacker can employ a privilege escalation attack to load a module into the kernel. Second, the attacker can locally or remotely exploit software vulnerabilities in the kernel code. For example, the attacker can inject code by overflowing a vulnerable kernel buffer. The NIST National Vulnerability Database shows that the Linux Kernel and Windows XP SP2 were found to have 81 and 31 such vulnerabilities in 2006. Third, direct memory access (DMA) capable peripheral devices can corrupt kernel memory via DMA writes.

The disclosed monitoring program may be implemented as a tiny virtualization platform, also referred to as a hypervisor, that uses hardware memory protections to ensure kernel code integrity. The monitoring program may virtualize the physical memory, allowing it to set hardware protections over kernel memory, that are independent of any protections set by the kernel. The monitoring program may also utilize the 10 Memory Management Unit (IOMMU) to protect approved code from DMA writes. Also, the monitoring program may virtualize the CPU's Memory Management Unit (MMU) and the IOMMU. This would ensure that the monitoring program can intercept and check all modifications to MMU and IOMMU state.

The disclosed monitoring program may be implemented with the following benefits in mind: (1) small code size to facilitate formal verification and manual audit, (2) limited external interface to reduce the attack surface, and (3) minimal kernel changes to facilitate porting commodity kernels. The monitoring program may be implemented on a variety of platforms including on a system with an AMD CPU utilizing the Linux kernel as will be illustrated in some examples of this disclosure. However, it should be recognized that the spirit of this disclosure is not limited to any specific platform or operating system. To reduce the complexity of the monitoring program, an implementation may use CPU-based virtualization (e.g., AMD's Secure Virtual Machine (SVM) technology) to virtualize the physical memory, the MMU, and the IOMMU. Intel's Trusted eXecution Technology (TXT) (formerly called LaGrande Technology (LT)) is also available to provide facilities similar to SVM. Using CPU-based virtualization support does not limit the deployment of the monitoring program because such support is now widely available on both Intel, AMD CPUs, and other chip-sets. The Device Exclusion Vector (DEV) protections may also be utilized to protect kernel memory from DMA-writes by peripherals.

These and other benefits and advantages will be apparent from the disclosure below.

BRIEF DESCRIPTION OF THE DRAWINGS

The present invention will now be described for purposes of illustration and not limitation in conjunction with the following figures wherein:

FIG. 13 illustrates the results of use of D.A. Wheeler's sloc program to count the number of lines of source code in the monitoring program prototype;

FIG. 14 illustrates the execution times of lmbench process and memory microbenchmarks;

FIG. 15 illustrates the breakdown of the monitoring program overheads in the lmbench process and memory microbenchmarks;

FIG. 16 illustrates the results of running lmbench context switch microbenchmarks;

DETAILED DESCRIPTION

The Threat Model

Figure 1:
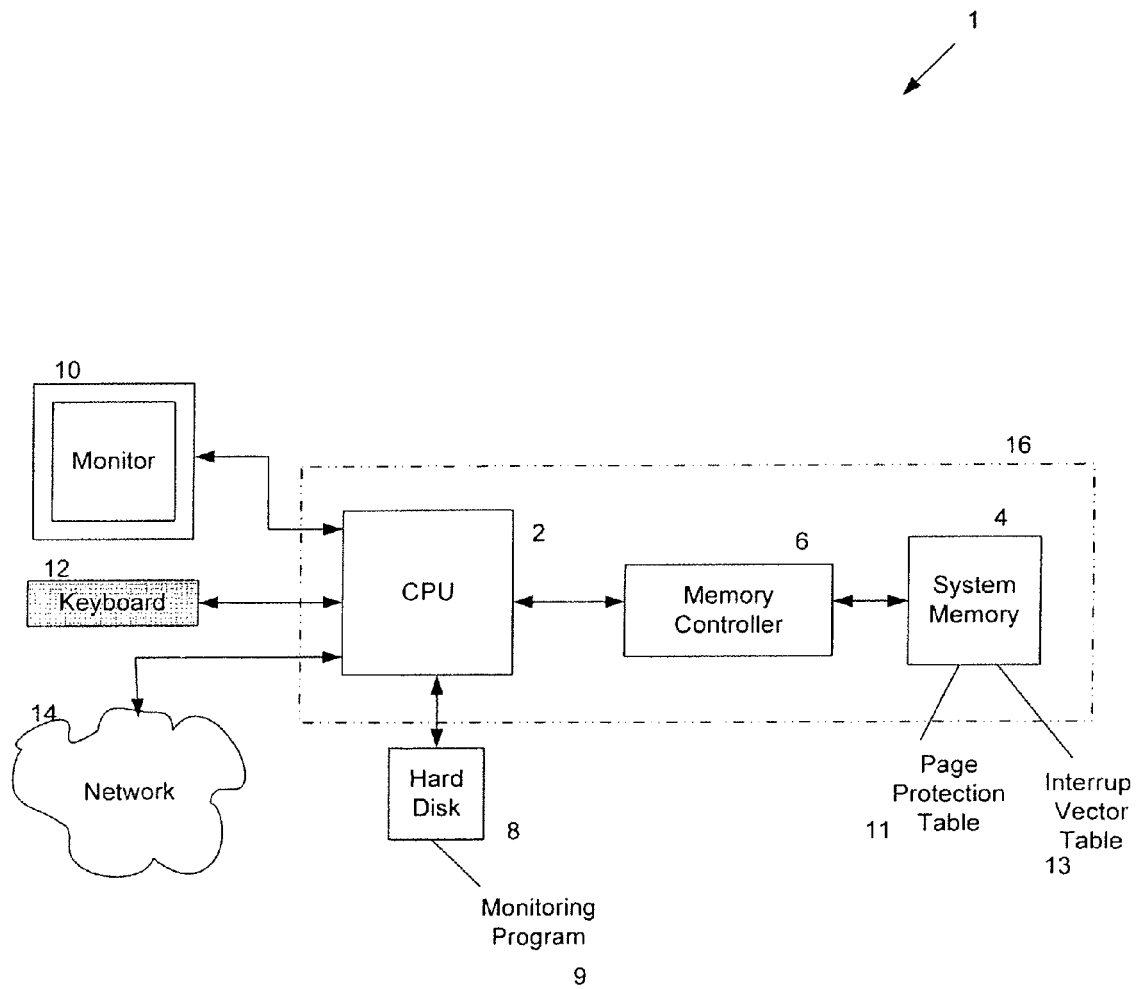
FIG. 1 is a block diagram illustrating a basic computer architecture which highlights a trusted computing base upon which the monitoring agent of the present disclosure may operate.

FIG. 1 is a block diagram depicting a basic computer architecture 1 upon which the monitoring program of the present disclosure may operate. The basic computer architecture is centered around a central processing unit (CPU) 2 which is responsive to system memory 4 for temporarily storing computer instruction code and data through a memory controller 6. The CPU 2 is also responsive to a hard disk 8 which carries the monitoring program 9. The hard disk 8 is also responsive to a collection of peripherals such as a monitor 10, keyboard 12, and other devices such as a mouse, webcam, microphone, speakers, etc., not shown. The CPU 2 may also be connected to a network 14 in any appropriate manner.

The disclosed systems and methods consider an attacker who controls everything in the system but the CPU 2, the memory controller 6, and system memory 4. This trusted computing base (TCB) is depicted by the dotted box 16 and is minimal for the von Neumann architecture (also called a stored-program computer), which is the architecture used by most computing devices today. Examples attacks are: arbitrary modification of all memory contents, injection of malicious code into the system firmware (also called the BIOS on x86 systems), malicious DMA writes to memory using peripherals, and the use of malicious peripherals connected to the system. Also, the attacker might be aware of zero-day vulnerabilities in the kernel and application software on the system. These vulnerabilities may be exploited via a number of vehicles including through a virus, a worm, a buffer overrun, a Trojan Horse, or other methods. The attacker may attempt to use these vulnerabilities to locally or remotely exploit the system.

Program Considerations

There are several considerations that were addressed in the creation of an enforcement agent 9 that enforces the guarantee of kernel code integrity over the lifetime of the system, under the assumption that the TCB 16 consists of the CPU 2, the memory controller 6, and the system memory 4. One issue is where in the software stack of the system should the enforcement agent execute. The enforcement agent 9 may be desired to be isolated from the kernel so that it can guarantee kernel code integrity even in the face of attacks against the kernel. Based on the TCB 16 assumption, one may rely on CPU-based protections to provide this isolation. CPU-based protections are based on the notion of privilege whereby more privileged software can modify both its own protections and those of less privileged software. Therefore, the enforcement agent 9 may execute at a higher CPU privilege level than the privilege level of the kernel.

A second issue is how to ensure the integrity of kernel code. The monitoring program 9 addresses this issue by ensuring that, when executing at the privilege level of the kernel (hereafter called the kernel mode), the CPU 2 refuses to execute any code that is not approved by the user. In the interest of simplicity, henceforth, the monitoring program 9 will be referred to as approving the kernel code, with the understanding that the monitoring program 9 uses the user supplied policy for code approval. The monitoring program 9 does not prevent code from being added to the kernel; only that the CPU 2 will refuse to execute unapproved code. For example, the attacker could exploit a kernel-level buffer overflow vulnerability to inject code into the kernel's data segment. But the CPU 2 will not execute the injected code because it is not approved by the monitoring program 9. An additional requirement is that the monitoring program's 9 approved code should not be modifiable by any entity on the system other than those in the monitoring program's TCB 16 and the monitoring program 9 itself. To implement these requirements, the monitoring program 9 needs to inform the CPU 2 which code is approved for execution in kernel mode and also protect the approved code from modification. The CPU-based protections provide a natural way to address these. The monitoring program 9 sets the CPU-based protections over kernel memory to ensure that only code approved by the monitoring program 9 is executable in kernel mode and that the approved code can only be modified by the monitoring program 9 or its TCB 16.

All CPUs support at least one other privilege level (other than the kernel mode and VMM privilege level), called user mode, at which user programs execute. Given that a CPU will switch between user and kernel mode execution via control transfers, the monitoring program 9 needs to prevent the attacker from modifying the expected control flow of these control transfers to execute arbitrary code with kernel privilege. This requires two checks. First, the monitoring program 9 needs to ensure that the targets of all control transfers that switch the CPU to kernel mode lie within approved code. Without this, the attacker could execute arbitrary code with kernel privilege by modifying the targets of control transfers that enter kernel mode. Second, the control transfers that exit kernel mode to enter user mode modify the privilege level of the CPU to that of user mode. Otherwise, the attacker could execute user programs with kernel privilege.

Properties for Approved Code Execution

For ease in conceptualization, the monitoring program 9 can be cast into requirements. The first requirement is that the CPU only execute code approved by the monitoring program 9 in kernel mode. Given that the CPU enters kernel mode from user mode, performs some processing in kernel mode, and exits kernel mode to return to user mode, this requirement can be met if the monitoring program 9 provides the following three properties:

P1: Entries into kernel mode (where an entry into kernel mode occurs at the instant the privilege of the CPU changes to kernel mode) should set the CPU's Instruction Pointer (IP) to an instruction within approved kernel code.

P2: After an entry into kernel mode places the IP within approved code, the IP should continue to point to approved kernel code until the CPU exits kernel mode.

P3: Every exit from kernel mode (where an exit from kernel mode is a control transfer that sets the IP to an address in user memory) should set the privilege level of the CPU to user mode.

Another requirement is that approved code should be modifiable only by the monitoring program 9 and its TCB 16. Assuming that system memory 4 can be modified by only code executing on the CPU 2 or through Direct Memory Access (DMA) writes by peripheral devices, this requirement can be stated as:

P4: Memory containing approved code should not be modifiable by any code executing on the CPU, except the monitoring program 9, or by any peripheral device.

The monitoring program 9 utilizes hardware memory protections to achieve P2 and P4 as will be described. P1 may be achieved by ensuring whenever the CPU enters to kernel mode it will start executing approved code, and P3 by intercepting and checking all kernel exits.

Using Hardware Memory Protections

Figure 2:
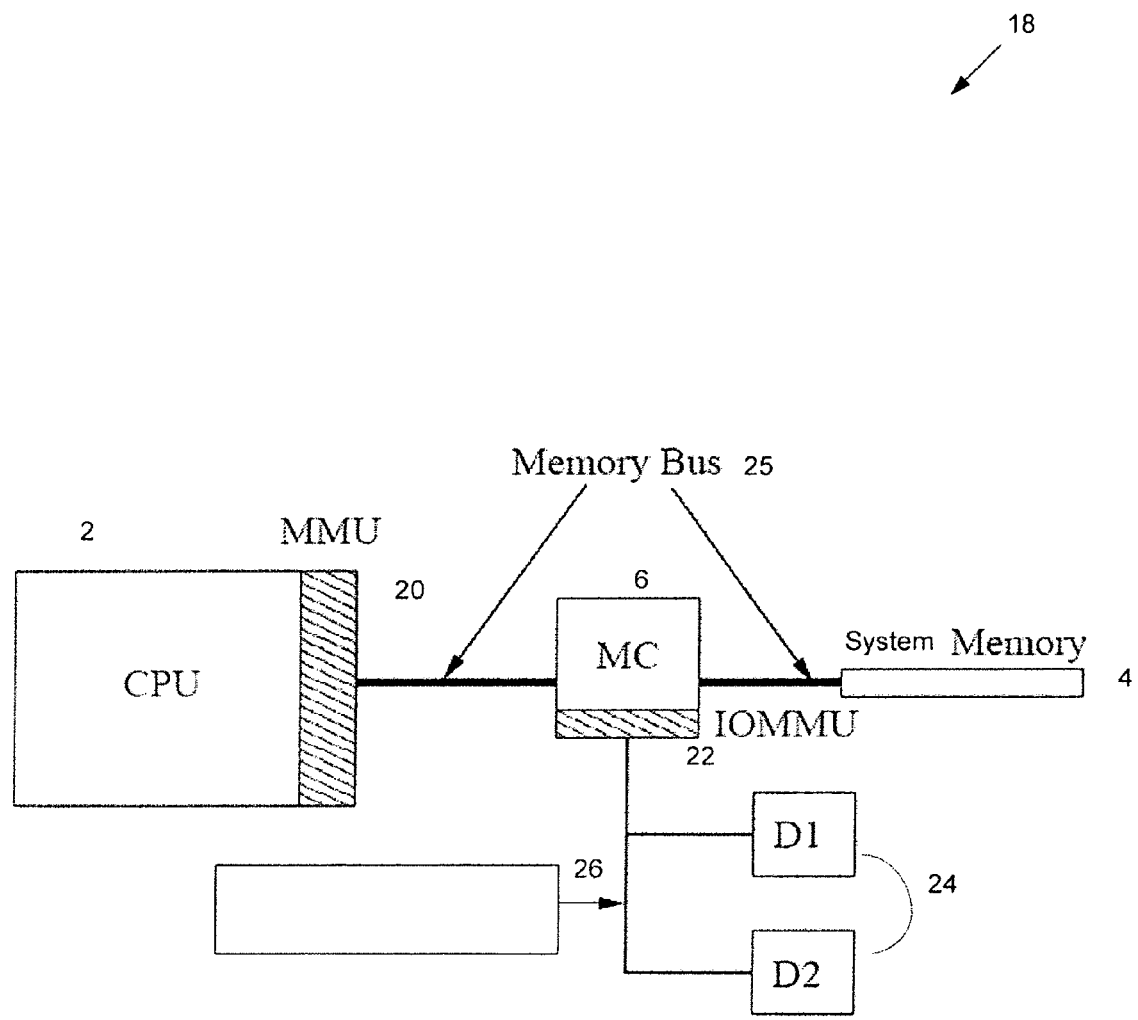
FIG. 2 illustrates a system-level overview of memory protections.

FIG. 2 depicts a system-level overview 18 of memory protections. In the system of FIG. 2, the CPU 2 is responsive to the system memory 4 through the memory controller 6. The memory controller is also responsive to one or more peripherals 24 through the peripheral bus 26. In this configuration, the contents of the system memory 4 are protected by the memory management unit (MMU) 20 and the 10 Memory Management Unit (IOMMU) 22. The MMU 20 enforces memory accesses from the CPU 2 while the IOMMU 22 enforces DMA write protections. The monitoring program 9 should control modifications to the MMU 20 and IOMMU 22 state. Because the monitoring program 9 executes at the privilege level of a VMM, it can virtualize the MMU 20 and IOMMU 22. This enables the monitoring program 9 to intercept and check all modifications to the MMU 20 and IOMMU 22 state.

The monitoring program 9 may use page tables as the basis of its MMU-based memory protections. Page tables, rather than other MMU based protection schemes, such as segmentation, may be preferred because page tables are supported by a large number of CPU architectures. However, other MMU based protection schemes may be used. The page table approach requires the monitoring program 9 to protect the page tables from being modified by any entity but the monitoring program 9 and its TCB 16. There are multiple ways to achieve this. One, the monitoring program 9 can keep the page tables in its own address space and allow the kernel to read and modify them only via "safe" function calls. Two, the monitoring program 9 could virtualize the system memory 4. Virtualizing the system memory 4 causes the addresses sent on the memory bus 25 to be different from the physical addresses seen by the kernel. Hence, the monitoring program 9 maintains page tables that translate the kernel's physical addresses to the physical addresses seen on the memory bus 25. These page tables could be kept in the memory program's address space because the kernel is unaware of the virtualization of physical memory.

The choice of which method to use illustrates a trade-off between performance on one hand and security and portability on the other. Using a function call interface is likely to be fast because there is no overhead of synchronizing the page tables maintained by the monitoring program 9 with the kernel's page tables (there is only one set of page tables). However, using a function call increases the size of the monitoring program's kernel interface which increases the security risk. Using a function call also requires modifications to the kernel's page table handling code which increases the amount of effort required to port a new kernel to the monitoring program 9. On the other hand, virtualizing physical memory is likely to be slower due to the synchronization overhead. However, virtualization may be better for security and ease of portability of the kernel. Many of the following examples utilize the virtualize physical memory approach. However, it should be noted that other approaches could be utilized. Henceforth, the page table used by the monitoring program 9 to virtualize physical memory will be called the Protection Page Table 11 (See FIG. 1).

In using the Protection Page Table 11 to set protections over kernel memory, the monitoring has to consider how the kernel and user memories are mapped into address spaces. In most commodity OSes today, the kernel and user memories share the same address space. Such a shared address space configuration could enable an attacker to modify the control flow of the kernel to execute user code with kernel privilege. For example, the attacker could exploit a buffer overflow vulnerability and modify a return address stored on the kernel's stack to point to user code. To prevent these kinds of attacks, and thereby achieve property P2, the monitoring program 9 sets the Protection Page Table 11 so that user memory is not executable when the CPU executes in kernel mode. On the other hand, it is clear that user memory has to be executable when the CPU is in user mode. Then, the monitoring program 9 has to intercept all transitions between kernel and user mode to modify the user memory execute permissions in the Protection Page Table 11. The monitoring program 9 uses the execute permissions themselves to intercept these transitions. The monitoring program 9 sets execute permissions in the Protection Page Table 11 only for the memory of the mode that is currently executing. Then, all inter-mode transitions cause protection violations, which inform the monitoring program 9 of an attempted mode change via a CPU exception.

Figure 3:
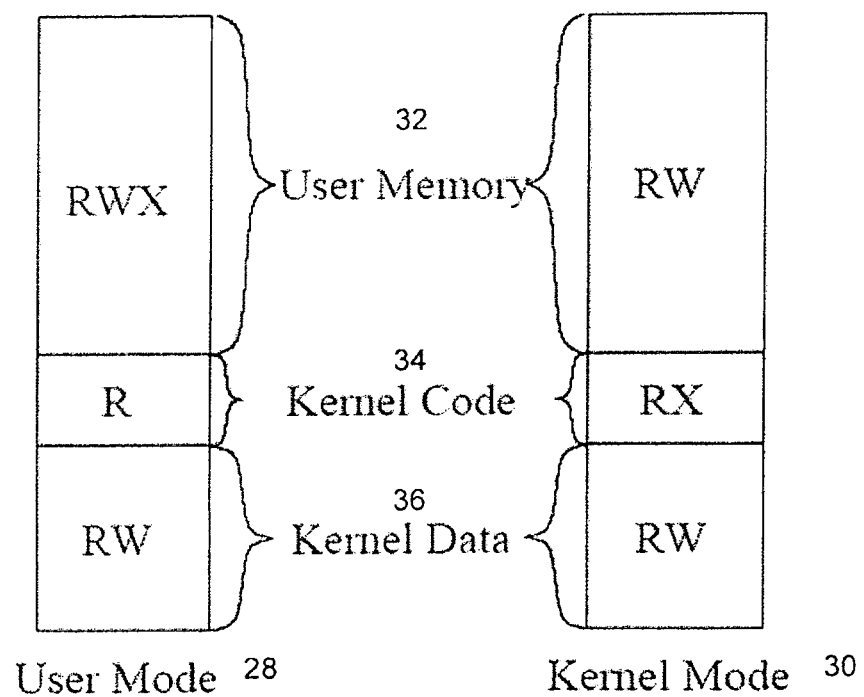
FIG. 3 illustrates page protection page settings maintained by a monitoring program during both user mode and kernel mode.

FIG. 3 illustrates how the monitoring program 9 manages memory permissions utilizing the protection page table. FIG. 3 depicts the page protection page settings maintained by the monitoring program 9 during both user mode 28 and kernel mode 30. In user mode 28, the user portion of memory 32 is may be read(R), written(W), or executed(X), and the kernel code portion 34 of memory may be read(R) without generating an exception. Additionally, the kernel data portion 36 of memory may be read(R) or written(W). In contrast, while in kernel mode 30, user memory 32 may only be read(R) and written(W) while kernel code 34 may be read(R) and executed(X) without generating an exception. Kernel data 36 may still be read(R) or written(W). At system start-up, the kernel usually executes before user programs. Therefore, the monitoring program 9 may initialize the Protection Page Table so that only the approved kernel code is executable.

On each entry to kernel mode, the monitoring program 9 sets execute permissions in the Protection Page Table so that only approved code will be executable. Then, the CPU 2 will generate an exception on every attempt to execute unapproved code in kernel mode. When the monitoring program 9 receives such an exception, it terminates the kernel. The monitoring program 9 also marks the approved code pages read-only in the Protection Page Table. This prevents any code executing on the CPU (except the monitoring program 9) from modifying approved code pages, thereby satisfying part of property P4. From FIG. 3 it can be seen that, in kernel mode, the pages of kernel memory will be either writable or executable, but never both. This type of memory protection is generally referred to as W exclusive-or X protection.

The monitoring program 9 uses the DMA write protection functionality of the IOMMU 22 to protect approved code pages from being modified by DMA writes. These protections along with the read-only protections set in the Protection Page Table 11 (see FIG. 1) ensure that property P4 is satisfied.

Managing Kernel Entries and Exits

The monitoring program 9 ensures that all control transfers through which the CPU enters kernel mode will set the IP to an address within the approved code. This requires the monitoring program 9 to know the target of every possible control transfer through which the CPU can enter kernel mode. An observation that allows us to find the target of every possible control transfer to kernel mode is that CPUs only allow kernel mode entries to transfer control to entry points designated by the kernel. This prevents user programs from triggering arbitrary control flows in kernel code 34 by entering at arbitrary points. The kernel informs the CPU of the permitted entry points by writing the addresses of such entry points (hereafter called the entry pointers) in CPU registers and data structures like the interrupt vector table (IVT) 13 (see FIG. 1). Then, the monitoring program 9 only has to ensure that all entry pointers point to instructions within approved code to achieve property P1.

To find all the entry pointers, one needs to identify all the CPU data structures that can contain entry pointers. By design, every CPU architecture has a set of control transfer events that trigger CPU execution privilege changes. Each control transfer event has an associated entry pointer in some CPU data structure. Therefore, the strategy to find all the entry pointers is to first create the entry list of control transfer events that can transfer control to kernel mode. The entry list can be created from the architectural specification of the CPU. Next, for each event in the entry list, find the CPU data structure which holds its entry pointer. In this manner, the list of all the CPU data structures which can hold the entry pointers is obtained The monitoring program 9 virtualizes the entry pointers and only permits the kernel to operate on the virtualized copies. This allows the monitoring program 9 to intercept and check all modifications to the entry pointers. The virtualization can be performed in two ways. First, the monitoring program 9 may provide the kernel with "safe" function calls through which the kernel can read and modify the entry pointers. Second, the monitoring program 9 may maintain shadow copies of the entry pointers for use by the CPU, and keep the shadow copies synchronized with the kernel's entry pointers. As with virtualizing physical memory, the choice between these two alternatives is a trade-off of performance versus security and portability. The shadowing method may reduce the size of the monitoring program's kernel interface and also reduces the number of changes required to port a kernel to the monitoring program 9. However, a variety of methods may be utilized to accomplish the desired results.

Methods that exit kernel mode should transfer control to code in user memory. If on each entry to kernel mode the CPU will start executing approved code, i.e., property P1 is satisfied, it is fairly direct to ensure that exits from kernel mode will set the CPU privilege to user mode (property P3).

Recall from FIG. 3 that the monitoring program 9 marks kernel memory nonexecutable in user mode. If property P1 is satisfied, all kernel mode entries will try to execute approved code, which is part of kernel memory. This will cause the CPU 2 to generate an exception. As part of handling this exception, the monitoring program 9 marks all user memory non-executable. Thus, any exit to user mode will cause a protection violation, generating a CPU 2 exception. As part of handling this exception, the monitoring program 9 sets the privilege level of the CPU 2 to user mode.

Overview of x86 Memory Protections

This section gives a brief overview of the two memory protection mechanisms of the x86 CPU which may be utilized in conjunction with the systems and methods of this disclosure, segmentation and paging.

In 32-bit mode, segment-based protections are based on four privilege levels called rings. Ring 0 is the most privileged while Ring 3 is the least privileged. The current execution privilege level of the CPU is stored in the (architecturally-invisible) CPL register. Segment-based protections divide up the memory into variable size regions called segments. Each segment of memory has a descriptor associated with it. This descriptor contains various attributes of the segment such as the segment base address, the segment size, and the segment access permissions. The descriptors are stored in two tables called the Global Descriptor Table (GDT) and the Local Descriptor Table (LDT). The CPU has two registers called the gdtr and ldtr that contain the addresses of the GDT and LDT, respectively. Software can refer to descriptors in the GDT and LDT by storing their indices in the CPU's segment registers. There are six segment registers: cs, ds, es, fs, gs, and ss. Of these the cs segment register holds the index of the descriptor of the code segment that the CPU is currently executing from. The ds, es, fs, and gs segment registers hold indices of descriptors of data segments while the ss segment register holds the index of the stack segment's descriptor.

Page-based protections divide the virtual address space of the CPU into pages of fixed size. Page table entries describe the access permissions of each page. Per-page execute permissions are supported by the CPU only when the Physical Address Extensions (PAE) paging mode is used. The CPU has a set of registers called the Control Registers which allow software to control various aspects of the MMU. In particular, the control register cr0 has two bits called pe and pg that allow software to turn memory protections on/off, and turn paging on/off, respectively. The control register cr3 holds the physical address of the page tables, while cr4 has the pae bit which turns the PAE mode on/off.

Control Transfer Events on the x86

An x86 CPU assumes that control transfers between rings always originate at a ring of lower privilege. In other words, a lower privilege ring calls a higher privilege ring, which returns to the lower privilege ring. Then, on the x86 architecture, the exit list of events that can cause the CPU to exit kernel mode contains the return family of instructions: ret, iret, sysexit, and sysret.

The entry list consists of the hardware interrupts and the exceptions, and the instructions in the call family: jmp, call, sysenter, int (software interrupt), and syscall. The entry pointers for hardware interrupts and exceptions, and software interrupts are located in the interrupt descriptor table (IDT). The CPU has a register called the idtr which holds the address of the IDT. The following is a brief description of the remaining instructions in the entry list: the jmp, call, sysenter, and syscall.

The entry pointers for the jmp and the call instructions exist in the GDT and the LDT. The x86 architecture does not allow the call and jmp instructions to directly specify a higher privilege code segment as the target. Instead, these instructions may use one of three data structures, the call gate, the task gate, or the task descriptor, as their target. The kernel is expected to set up these data structures with the addresses of acceptable entry points. The CPU then ensures that the jmp and the call instructions will transfer control only to entry points permitted by the kernel. The task gates and the call gates can reside in the GDT or the LDT. Task descriptors can only reside in the GDT.

Sysenter and syscall are special instructions that decrease the latency of system calls. The entry pointers for the sysenter and the syscall instructions are in CPU registers called the model specific registers (MSR).

The sysenter instruction uses the MSRs msr_sysenter_cs and msr_sysenter_eip for its entry pointer. When a user mode program executes the sysenter instruction, the CPU loads the cs segment register and the IP from the msr_sysenter_cs and msr_sysenter_eip respectively. The syscall instruction was recently introduced as replacement for sysenter. The use of this instruction is enabled by setting the efer.sce bit of the MSR efer. It uses the msr_star for its entry pointer. On the execution of the syscall instruction, the CPU loads cs and the IP with bits 47-32 and bits 31-0 of the star respectively.

Overview of AMD's SVM Extensions

Figure 4:
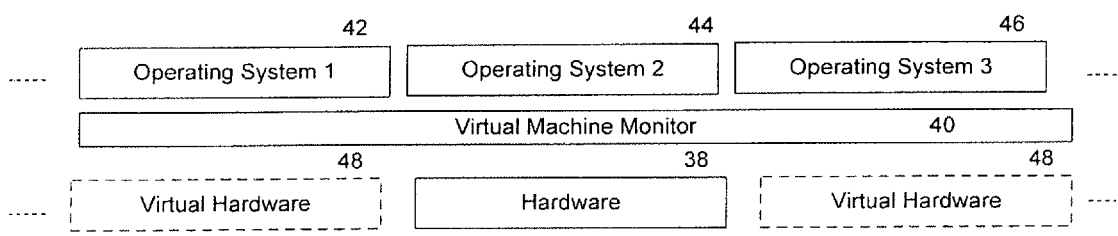
FIG. 4 illustrates a high-level overview of operating system virtualization.

FIG. 4 depicts a high-level overview of operating system virtualization. The configuration of FIG. 4 is based upon system hardware 38 on which the virtual machine monitor (VMM) 40 operates. The VMM 40 allows the system hardware 38 to execute multiple operating systems 42, 44, and 46. The VMM 40 virtualizes hardware 48 for each operating system 42, 44, and 46 and maps the vitualized hardware 48 to the system hardware 38 such that each operating system 42, 44, and 46 runs independently of the others.

Figure 5:
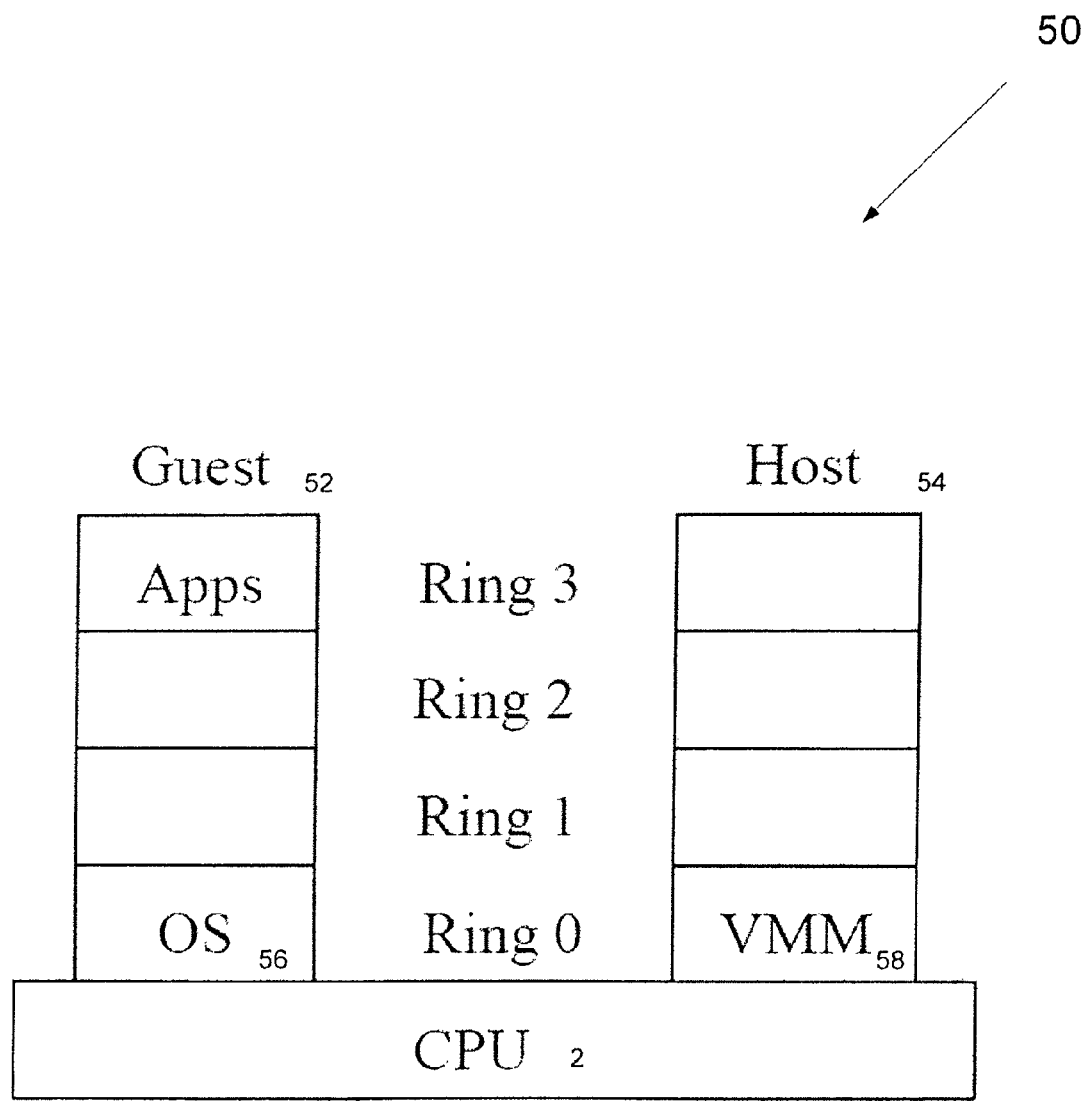
FIG. 5 illustrates the CPU privilege levels available to both the host machine and operating systems.

FIG. 5 depicts the CPU privilege levels available to both the host machine and operating systems 42, 44, and 46 operating through the VMM 40 where Ring 0 depicts the highest privilege level and Ring 3 depicts the lowest privilege level. AMD provides CPU-based virtualization support via the SVM extensions. SVM separates the CPU execution into two modes called guest mode 52 and host mode 54. The VMM 44 (also referred to as host) executes in host mode 54 while all the virtual machines (VM) (also referred to as guests) execute in guest mode 52. The host and guest modes have separate address spaces. Software executing in both modes can execute in any of the four privilege levels. For example, under SVM, it is possible for both the guest OS 56 and the VMM 58 to execute at the highest CPU privilege level. FIG. 5 shows one possible execution configuration of the host 54 and guest 52 modes when using SVM extensions.

Each guest has a data structure called the Virtual Machine Control Block (VMCB) associated with it, which contains the execution state of the guest. The value of the CPL register is a part of this execution state. To execute a guest, the VMM calls the vmrun instruction with the VMCB as the argument. The CPU then loads the execution state of the guest from the VMCB and begins executing the guest. Once started, the CPU continues to execute the guest until an event that has been intercepted by the VMM occurs. On hitting an intercept, the CPU suspends the execution of the guest, stores the guest's execution state in the VMCB, and exits to the host. The host then executes until it resumes a guest using vmrun.

Intercepts allow the host to intercept various CPU events that occur during the execution of the guest. The host indicates which events in the guest that the host wants to intercept by setting bits in the VMCB. Through intercepts, the host executes at a higher CPU privilege than the guests because it can control what operations the guests are allowed to perform. SVM defines four kinds of intercepts: instruction intercepts, interrupt and exception intercepts, IO intercepts, and MSR intercepts. Instruction intercepts allow the host to intercept the execution of various instructions. Interrupts and exceptions delivered to the guest are intercepted by means of the interrupt and exception intercepts. SVM has a mechanism called event injection that allows the host to pass the intercepted interrupts and exceptions to the guest. IO intercepts are used by the host to intercept reads and writes of x86 IO ports by the guest. Finally, the MSR intercepts allow the host to intercept guest reads and writes to MSRs.

SVM provides support for a limited IOMMU by modifying the memory controller to add DMA read and write protection support for physical memory on a per page basis. This protection is enabled through the use of Device Exclusion Vectors (DEV), which are bit vectors with one bit for each 4 Kbyte physical page. If the bit corresponding to a physical page is set, the memory controller 6 disallows any DMA reads from or DMA writes to that page.

The DEV mechanism is controlled through a set of configuration registers which are mapped to the Peripheral Component Interconnect (PCI) Configuration Space. Software can read and write registers in the PCI Configuration Space using two I/O ports called the Configuration Address Port and the Configuration Data Port. Software writes the address of the register it wants to access to the Configuration Address Port and reads or writes the register by reading or writing the Configuration Data Port.

Figure 6:
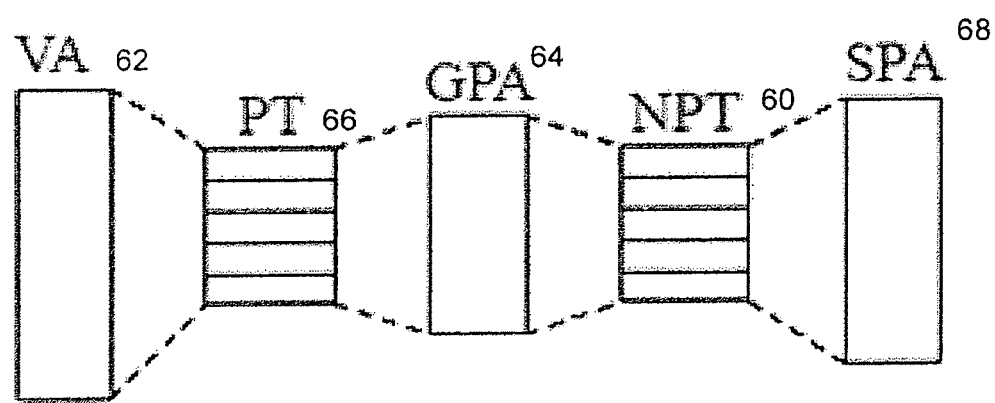
FIG. 6 illustrates a two step translation from virtual to system physical addresses.

FIG. 6 is an illustration of a two step translation from virtual to system physical addresses. In the configuration of FIG. 6, the virtual address space (VA) 62 maps to the guest physical address space (GPA) 64 through the guest kernel's page table (PT) 66. The GPA maps to the system physical address space (SPA) 68 through the nested page tables (NPT) 60. Because the host virtualizes physical memory, the physical addresses used by a guest could be different from the physical addresses that are sent on the memory bus. Therefore, the host needs to translate the guest's physical addresses to the physical addresses sent on the memory bus (hereafter called the system physical addresses). SVM provides nested page tables (NPT) 60 for this purpose. That is, the NPT 60 provide CPU-supported physical memory virtualization. The NPT 60 is maintained by the host; the guest kernel maintains its own page tables to translate virtual addresses to guest physical addresses. Note that the NPT 60 is used only when the CPU is executing in guest mode. When executing in host mode, the CPU will use the page tables of the host because physical memory is not virtualized in host mode.

Accesses to physical memory pages are subjected to permission checks in both the NPT 60 and guest kernel page tables 66. In particular, a page is writable only if it is marked writable both in the kernel page table 66 and in the NPT 60. Similarly, the contents of a page are executable only if the page is marked executable in both the kernel page table 66 and in the NPT 60. The CPU generates a Nested Page Fault exception and exits to the host on any NPT protection violation.

The NPT mechanism also provides separate copies of the all control registers for the host and the guest. The nested_cr3 register contains the pointer to the NPT 60. The guest control registers control the MMU configuration for address translation between virtual and guest physical addresses and the host control registers control guest physical to system physical address translation.

SVM adds Address Space Identifier (ASID) bits to the Translation Lookaside Buffer (TLB) entries to allow the CPU to distinguish between the TLB entries of the different address spaces (the host and guests) that can co-exist due to virtualization. Tagging the TLB entries with the ASID eliminates the need to flush the TLB when switching address spaces.

Late launch is a capability of SVM that allows the CPU to execute an arbitrary piece of code in isolation from all entities on the system, but the CPU 2, the memory controller 6, and the system memory 4. A late launch can be invoked at any time during the operation of the system. If the system has a Trusted Platform Module (TPM) chip, late launch also allows an external verifier to verify that the correct code was invoked for execution.

Implementation Using AMD SVM

The following is a discussion of how the monitoring program 9 described previously may be realized on a system that has an AMD CPU with SVM extensions. First is a description of how the monitoring program 9 protects its own memory. Then a discussion of physical memory virtualization in the monitoring program 9 is presented, followed by the protection of the DEV mechanism virtualization. Finally, a description of how the monitoring program 9 handles kernel entry and exit is presented. An important thing to remember while reading this section is that the monitoring program 9 is a hypervisor (and not a VMM) and supports only one guest (hence the reference to the kernel in what follows).

Allocating and Protecting the Monitoring Program Memory

The monitoring program 9 executes in SVM host mode while the kernel and applications execute in guest mode. Thereby, the monitoring program 9 executes at a higher CPU privilege level than the kernel. It intercepts events in the kernel and applications to virtualize the MMU, the IOMMU, and system memory 4.

Using the host mode gives the monitoring program 9 its own address space, which simplifies protection of the monitoring program's memory. The monitoring program 9 ensures that its physical memory pages are never mapped into the Protection Page Table 11 shown in FIG. 1. Because the Protection Page Table 11 is maintained by the monitoring program 9 it is simple to check that the above condition holds. Also, the monitoring program 9 uses the DEV mechanism to protect its physical pages against DMA writes by devices.

The question of which physical pages the monitoring program 9 should allocate for its own use requires consideration. The main issue here is that of handling DMA correctly. In a system with the monitoring program, all DMA transfers set up by the kernel use guest physical addresses to specify the source and destination. Because the monitoring program 9 virtualizes system 4 memory, the guest physical addresses can be different from the system physical addresses. Therefore, guest physical addresses of the DMA transfers need to be translated to system physical addresses for DMA transfers to work correctly. The ideal solution to this problem is to use an IOMMU that will translate the guest physical addresses used by a device during DMA to system physical addresses. The monitoring program 9 only needs to ensure that the IOMMU uses the correct Protection Page Table. However, SVM currently does not provide such an IOMMU facility. In the absence of hardware support, the monitoring program 9 could intercept all DMA transfer setup performed by the kernel in order to translate between guest and system physical addresses. However, intercepting DMA transfer setup is not simple. It depends heavily on the design of the kernel as it requires the kernel to call the monitoring program 9 as part of each DMA transfer setup. Hence this method may not be optimal, given the desire to reduce the size of the monitoring program's kernel interface and minimize the changes required to port the kernel.

Instead, the monitoring program 9 in one embodiment circumvents the whole issue of translating addresses for DMA by making sure that the guest to system physical address mapping is an identity map. To achieve the identity mapping, the monitoring program 9 allocates its physical memory starting from the top of the installed RAM. The kernel uses all memory from address zero to the start of the monitoring program's physical memory. The monitoring program 9 informs the kernel of the reduction in physical memory available by passing a command line parameter at kernel boot.

Virtualizing the MMU and Memory

The following is a discussion of how the monitoring program 9 virtualizes the system memory 4 to set page-table-based memory protections. The details depend on whether one utilizes a software or a hardware method to virtualize physical memory. The software virtualization uses shadow page tables (SPT) as the Protection Page Table, and the hardware virtualization uses the SVM NPT. Even though the NPT offers better performance, the following examples implement SPT support in the monitoring program 9 because current x86 CPUs from AMD do not have support NPT. However, multiple approaches may be used to accomplish this virtualization task.

SVM's nested paging facility provides a second set of page tables (the NPT) that translate guest physical addresses to system physical addresses (as shown in FIG. 6). The NPT is well suited for setting page-table-based protections both from a performance and security perspective due to two reasons.

First of all, the design of SVM ensures that access permissions of a physical page are the more restrictive of those in the kernel's page tables and the NPT. Therefore, the monitoring program 9 uses the NPT to set its memory protections, without any reference to the kernel's page tables. It is easy for the monitoring program 9 to isolate the NPT from accesses by the guest because the existence of the NPT is transparent to the guest. The monitoring program 9 isolates the NPT by allocating physical pages from its own memory for the NPT. Because the monitoring program's physical pages are never accessible to the guest and they are protected against DMA writes, the NPT is inaccessible to everything but the monitoring program 9 and the monitoring program's TCB 16.

Secondly, the nested paging facility eliminates the need for the monitoring program 9 to intercept kernel writes to the MMU state. The nesting paging facility provides the guest and host with their own copies of the Control Registers, which control MMU state. Because the monitoring program 9 uses only the NPT to set its protections, the monitoring program 9 can allow the kernel (guest) to freely modify the guest control registers. Put another way, with nested paging, the monitoring program 9 can virtualize the MMU without intercepting kernel writes to the control registers. Also, because the contents of the NPT are completely independent from those of the kernel's page tables there is no need for the monitoring program 9 to update the NPT when the kernel makes changes to the kernel's page tables. Clearly, both of these factors result in better performance and decrease the code size of the monitoring program 9.

The only drawback of using the NPT is that the kernel needs to pass guest physical addresses rather than virtual addresses in its requests to the monitoring program 9 to change memory permissions. However, this requirement for address translation is unlikely to be a performance bottleneck because this is not a frequent event (modification of memory permissions only needs to be done when kernel modules are loaded or unloaded). Also, passing guest physical addresses does not require any modifications to the Linux kernel because it already has functions to translate between virtual and physical addresses.

As mentioned previously, there are two tasks that the monitoring program 9 accomplishes via page-table-based protections. One, it sets W exclusive-or X protections over kernel memory when executing in kernel mode. Two, it modifies the execute permissions of user and kernel memory depending on whether the CPU executes in kernel or user mode. Both tasks are easily accomplished using the NPT.

Figure 7:
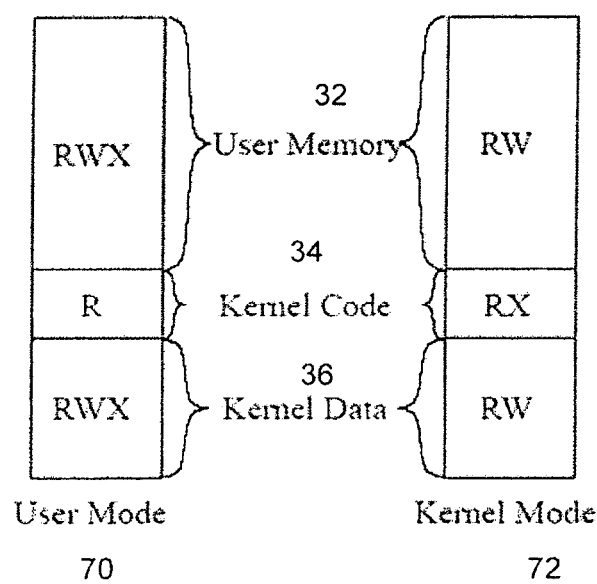
FIG. 7 illustrates NPT based memory protections for user and kernel modes.

FIG. 7 depicts NPT based memory protections for user and kernel modes. While the CPU operates in user mode 70, the user memory 32 has read(R), write(W), and execute(X) permission while the kernel code 34 has read(R) permissions and the kernel data 36 has read(R), write(W), and execute(X) permissions. In contrast, in kernel mode 72 user memory 32 has read(R) and write(W) permissions, kernel code 34 has read(R) and execute(X) permission, and the kernel data 36 has read(R) and write(W) permissions.

To set the W exclusive-or X protections, the monitoring program 9 maintains a list of guest physical pages that contain approved code. The kernel can request modifications to this list. Any requests to add new entries in the list may be approved by the user-supplied approval policy. When executing in kernel mode, the monitoring program 9 clears the no-execute (NX) permission bit only for the NPT entries of guest physical pages in the list.

Modifying execute permissions over user and kernel memory requires monitoring program 9 to know which guest physical pages contain the kernel's data segment and which are user pages. The monitoring program 9 could maintain a list of guest physical pages that belong to the kernel's data segment similar to that for the kernel code 34. However, adopting this design is likely to degrade performance because the pages frequently move between the kernel data segment and user space. While this design would be effective, the following discussion outlines another possible option.

When the CPU 2 executes in user mode 70, the monitoring program 9 marks all guest physical pages except those containing approved code executable in the NPT. Note that this does not open an avenue for attacks that could execute kernel data segments in kernel mode 72 because property P1 guarantees that all control transfers to kernel mode will set the IP to an address within approved code, and the monitoring program 9 satisfies property P1 using a different mechanism than the NPT (by ensuring that the entry pointers all point to approved code). Note that the monitoring program 9 still makes the approved kernel code 34 non-executable during user mode execution so that all transitions from user mode 70 to kernel mode 72 can be easily intercepted via nested page faults.

To keep the size of the NPT handling code small and to reduce the latency of switches between user 70 and kernel 72 mode, the monitoring program 9 maintains two NPTs, one for address translations during user mode 70 execution and the other for address translations during kernel mode 72 execution. These two NPTs set different permissions on user and kernel memory as FIG. 7 shows. The synchronization costs of maintaining two NPTs are not high because the NPTs need to be modified only when kernel code 34 is changed.

On each transition from user mode 70 to kernel mode 72 or vice versa, the monitoring program 9 changes the nested_cr3 field in the VMCB to point to the NPT of the mode that is going to execute next. To avoid flushing the TLB as part of these transitions, the monitoring program 9 associates the two NPTs with different ASIDs. The drawback of doing this is increased data TLB pressure due to the fact that the translation for the same virtual address could exist in the data TLB under two different ASIDs. The instruction TLB does not suffer from this problem because user mode will never execute kernel code 34 and vice versa. Different ASIDs are utilized for the two NPTs under the assumption that the performance benefits of not having to flush the TLB on every transition between user 70 and kernel 72 modes should be greater than the performance degradation due to the increased data TLB pressure.

The following is a description of the monitoring program's software memory virtualization technique based on shadow page tables (SPT). A SPT virtualizes memory by maintaining the mapping between virtual and system physical addresses. Therefore, the SPT needs to be kept synchronized with the kernel's page tables, which translate virtual addresses to guest physical addresses. Using an SPT-based approach incurs both a code size increase and performance penalty compared to a NPT-based implementation, mainly due to this synchronization requirement.

The SPT implementation in the monitoring program 9 uses a single SPT for both user 70 and kernel 72 mode execution. As with the NPT, the monitoring program 9 protects the SPT by allocating physical pages for it from the monitoring program's memory. The monitoring program 9 also keeps the SPT synchronized with the current kernel page table. Having a single SPT increases the cost of transitions between the user 70 and kernel 72 modes because execute permissions over user 70 and kernel 72 mode have to be modified on each transition. In spite of this, an SPT is not used for each of user 70 and kernel 72 mode due to fact that SPTs need to modified far more frequently than NPTs. Unlike the NPTs which only need to modified on changes to kernel code 34, the SPT needs to modified whenever the kernel makes modifications to its current page table (for example, on a page fault) or when it makes another page table current (as part of a context switch). Having to synchronize two SPTs with the kernel's page table would double the number of memory writes needed for the frequently used SPT synchronization operation.

Figure 8:
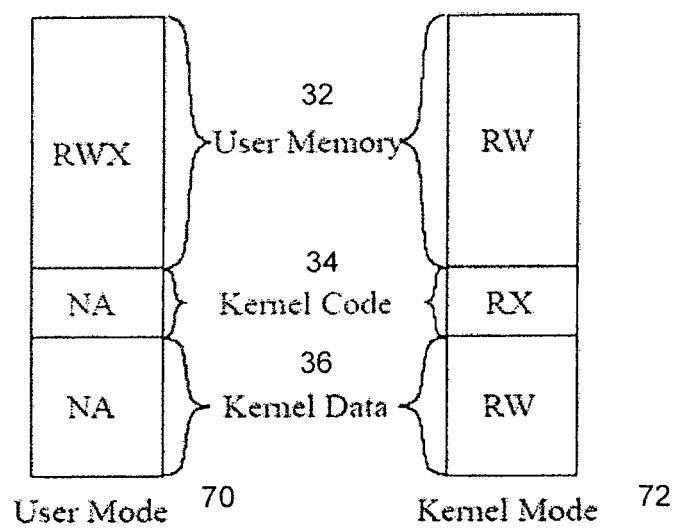
FIG. 8 illustrates SPT based memory protections for user and kernel modes.

FIG. 8 depicts SPT based memory protections for user and kernel modes. While the CPU 2 operates in user mode 70, the user memory 32 has read(R), write(W), and execute(X) permission while the kernel code 34 is not available and the kernel data 36 is also not available. In contrast, in kernel mode 72 user memory 32 has read(R) and write(W) permissions, kernel code 34 has read(R) and execute(X) permission, and the kernel data 36 has read(R) and write(W) permissions.

Like the NPT, the monitoring program 9 performs two operations on the SPT: sets W exclusive-or X protections over kernel code 34 and modifies execute permissions over user 32 and kernel code 34 on each mode transition. FIG. 8 shows how the monitoring program 9 sets protections in the SPT for user 70 and kernel mode 72 execution. One point to note is that when the monitoring program 9 uses shadow paging, the SPT are the only page tables used by the CPU 2. Therefore, (unlike the NPT) the permissions that the monitoring program 9 sets in the SPT are be the more restrictive of its own permissions and those of the kernel.

The monitoring program 9 needs to modify execute permissions of user 32 and kernel 34 memory so that all mode transitions cause page faults. To minimize the overhead of modifying the execute permissions on each transition between user 70 and kernel modes 72, the monitoring program 9 uses the NX bits in the page table entries in the second level of the page table hierarchy (the first level entries do not have NX bits). This optimization allows the monitoring program 9 to switch execute permissions by changing the NX bits in only the 4 second level page tables. Because each page table is 4 Kbytes in size the maximum amount of data accessed by this operation will be 16 Kbytes.

Figure 9:
FIG. 9 illustrates the different guest operations that the monitoring program needs to intercept in order to synchronize the SPT with the kernel's page tables.
Figure 9:
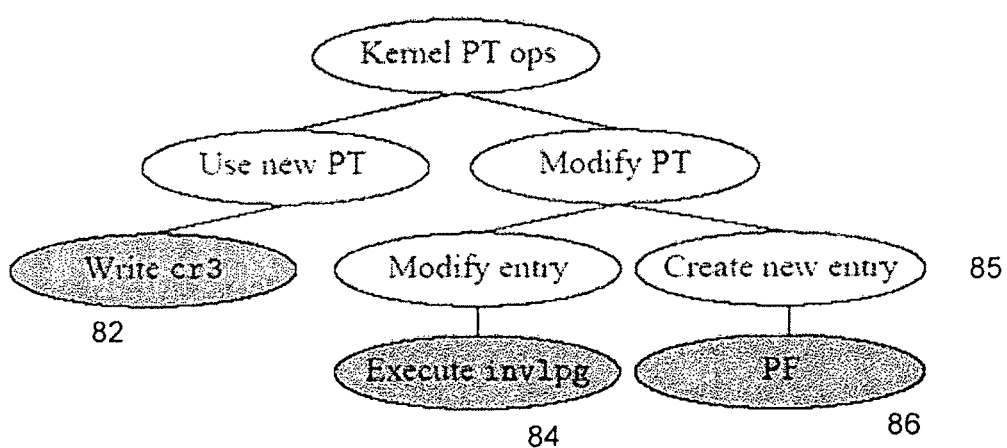

FIG. 9 shows the different guest operations that the monitoring program 9 needs to intercept to synchronize the SPT with the kernel's page tables. Each non-leaf node indicates an operation that the kernel can perform on its page tables. The leaf nodes indicate the guest event that the monitoring program 9 must intercept to learn of the corresponding kernel operation. The cr3 register holds the pointer to the page tables. Therefore, the kernel will write 82 to cr3 when it wants to use a new page table. The monitoring program 9 intercepts this write and copies the new kernel page table into the SPT. The invlpg instruction is executed at 84 to invalidate a single TLB entry. When the kernel modifies an existing page table entry it may invalidate the corresponding TLB entry. Intercepting the execution of invlpg 84 enables the monitoring program 9 to synchronize the SPT with modified kernel page table entry. Finally, when the kernel creates a new entry 85 in its page tables, and attempts to use it, it will cause a page fault 86 because the corresponding entry will not exist in the SPT. The monitoring program 9 uses such shadow page faults to synchronize the SPT by copying the newly created kernel page table entry.

The SPT synchronization code of the monitoring program 9 uses a very simple design that trades off performance for security and ease of porting a kernel. For example, the synchronization code does not try to aggressively batch the synchronization of the SPT to amortize synchronization costs. On the other hand, no modifications to the kernel's page table handling code are necessary.

Because the SPT synchronization relies on the kernel page tables, which could be under the attacker's control, the monitoring program 9 performs a couple of checks to ensure that the memory protections in the guest are set correctly to achieve approved code execution in kernel mode 72.

First, the monitoring program 9 checks for and prevents virtual address aliasing of approved code physical pages. If this check is not performed, the attacker could modify the contents of approved code pages using the following attack. The attacker could create, in the kernel page table, a writable virtual alias to a physical page containing approved code. The monitoring program's SPT synchronization code, without an aliasing check, will copy the attacker's page table entry into the SPT. The attacker could then modify the contents of the approved code physical page by writing to it using virtual addresses corresponding the writable virtual alias it created.

Second, the monitoring program 9 needs to check if the kernel page tables map approved code virtual pages to physical pages containing approved code. Without this check, the attacker could execute arbitrary code in kernel mode 72. The attacker could do this by modifying the kernel page table entries that translate the virtual addresses of approved code to point to physical pages that contain the attacker's code. If the monitoring program 9 copied the kernel's page table into the SPT without checking the physical address contained in the entries that translate virtual addresses of approved code, the CPU 2 would then execute the attacker's code instead of the approved code.

To perform the above two checks, the monitoring program 9 internally maintains the list of virtual page to physical page translations for approved code pages. When synchronizing the SPT with the kernel's page tables, the monitoring program 9 consults this list to detect if any entry in the kernel's page table is an alias of an approved code physical page. If virtual address aliasing is detected, the monitoring program 9 does not copy aliasing kernel page entry. Instead it marks the corresponding SPT entry invalid. Also, the monitoring program 9 does not copy the page table entries that translate virtual addresses of approved code into the SPT from the kernel page table. Instead, it sets these entries based on the entries in its internal list of approved code pages.

The final issue that needs to be dealt with in regard to the monitoring program's SPT implementation is how the monitoring program 9 controls kernel modifications to the MMU state. To do this, the monitoring program 9 intercepts writes to the cr0 and cr4 registers. These intercepts enable monitoring program 9 to prevent kernel writes to the pe, pg, and pae bits.

Protecting the DEV Mechanism

As noted previously, SVM provides the DEV mechanism to control DMA access to physical memory pages. Guest software and devices need to be prevented from modifying both the DEV bit vector and the DEV configuration registers in the PCI configuration space. The monitoring program 9 protects the DEV bit vector in the same manner it protects the SPT and the NPT: by allocating physical pages for the bit vector from its own memory. By design, the memory controller 6 blocks all accesses from devices to the DEV PCI configuration space. The monitoring program 9 protects the DEV configuration registers against writes by guest software by virtualization.

The I/O intercept mechanism of SVM provides a convenient way for the monitoring program 9 to virtualize the DEV configuration registers. The monitoring program 9 intercepts all writes to the Configuration Data Port. The I/O intercept handler in the monitoring program 9 figures the target of the write by looking at the address in the Configuration Address Port and blocks any write by guest software to the DEV configuration registers. If the write is going to any other PCI configuration register the I/O intercept handler performs the write on behalf of the guest software.

Kernel Mode Entry and Exit

Next is a description of how the monitoring program 9 achieves properties P1 and P3 on the x86 architecture. Property P3 requires that all kernel mode 72 exits set the privilege level of the CPU 2 to that of user mode 70. In the case of the Linux OS executing on a x86 CPU, user programs execute in Ring 3 (See FIG. 6). Then, on kernel mode 72 exit the monitoring program 9 sets the privilege level of the CPU 2 to Ring 3. As was pointed out previously, as far as all kernel mode 72 entries set IP to approved code (property P1), all kernel mode 72 exits will cause a protection exception. As part of handling this exception the monitoring program 9 sets the CPL field of the VMCB to 3, thereby ensuring that when the guest resumes execution, the CPU will execute in Ring 3.

The monitoring program 9 ensures that all CPU 2 entries into kernel mode 72 will satisfy property P1 (IP will point to approved code at entry) by checking that all entry pointers point to approved code. Earlier, it was shown that the entry pointers all exist in the GDT, the LDT, the IDT, and some MSRs (for syscall and sysenter). The need was also shown to maintain shadow copies of the three tables and the relevant MSRs to satisfy property P1. By maintaining these shadow copies the monitoring program 9 ensures that the entry pointers used by the CPU all point to approved code. Following is a description of how the monitoring program 9 maintains the shadow copies of the different entry pointers on the x86.

Maintaining shadow copies of the MSRs is uncomplicated because SVM provides facilities for intercepting read and write to each MSR. The monitoring system sets bits in the VMCB to intercept writes to the MSRs msr_sysenter_cs, msr_sysenter_ip, and the msr_star. The intercepts enable the monitoring system to check whether the entry pointers the kernel writes to these MSRs point to approved code.

Shadowing the GDT, LDT, and IDT is somewhat more involved because the goal is to check and write-protect not only the CPU pointers to the GDT, LDT, and IDT (the gdtr, ldtr, and idtr) but also the contents of the tables themselves. While SVM provides facilities to intercept writes to the gdtr, ldtr, and idtr, the tables themselves exist in system memory 4 and need to be write-protected via shadowing.

However, merely maintaining shadow copies of all entry pointers is insufficient to guarantee property P1. To see why this is so, first note that the entry pointers all contain virtual addresses. Then note that the approved kernel code 34 itself is resident in physical pages. Therefore, the page tables translate the virtual addresses of the entry pointers to physical addresses corresponding to approved code. Otherwise the attacker could violate property P1 by having the virtual addresses of the entry pointers point to physical pages of its choice.

In view of the above, the monitoring program 9 needs to maintain shadow copies of the GDT, LDT, and IDT to write-protect the virtual addresses of the entry pointers. It also needs to check and write-protect the page table entries that translate the virtual addresses of the entry pointers to physical addresses. Also, note that the page table entries that translate the virtual addresses present in the gdtr, ldtr, and idtr also need to be similarly checked and write-protected.

Following is a discussion of how the monitoring program 9 synchronizes the shadow copies of these tables with their kernel counterparts. Then, the issue of checking and write-protecting the shadow tables as well as the page table entries that translate the virtual addresses of the entry pointers, and the virtual addresses present in the gdtr, ldtr, and idtr is addressed. In the discussion that follows, these page table entries are referred to as the critical page table entries.

To deal with the synchronization issue, it is observed that the shadow copies of these tables only need to control execution in user mode 70 because property P1 deals with transition from user mode 70 to kernel mode 72. In other words, during kernel mode 72 execution the CPU 2 can use the kernel's GDT, LDT, and IDT. This observation enables two simplifications. One, a lazy synchronization scheme can be implemented to maintain shadow copies of the GDT, LDT, and IDT. This lazy synchronization scheme only synchronizes the shadow tables when the CPU transitions from kernel 72 to user 70 mode. Because all legitimate modifications to these tables can only occur in kernel mode 72, the lazy synchronization allows the monitoring program 9 to batch all its updates to the shadow copies. As part of the synchronization, the monitoring program 9 checks that all entry pointers in the shadow GDT, LDT, and IDT contain virtual addresses of approved kernel code 34. Two, the monitoring program 9 does not need to intercept writes to the gdtr, ldtr, and idtr. Because the shadow tables need to be in control of execution only in user mode 70, the monitoring program 9 can set these registers to point to the shadow copies as part of the kernel mode 72 to user mode transition. This it does by changing the corresponding values in the VMCB as part of handling a kernel 72 to user 70 mode transition. Any attempt by the user programs to modify any of these registers will result in the CPU causing an exception. Because the corresponding entry pointer is pointing to approved kernel code 34, this exception will cause approved kernel code 34 to be invoked, satisfying property P1.

From the description of the lazy synchronization scheme and from the requirement that kernel mode 34 exits cause exceptions, it can be seen that a circular dependency exists.

The lazy synchronization scheme requires each exit from kernel mode 34 to cause an exception so that the shadow GDT, LDT, and IDT can be synchronized with the corresponding tables in the kernel. On the other hand, ensuring that an exception will occur on kernel mode 72 exit requires that the shadow GDT, LDT, and IDT contain valid entry pointers because user mode 70 will be marked non-executable only if the control returns to approved kernel code 34 on kernel mode 72 entry. This circular dependency is broken by setting up an initial condition. It is noted that at system start-up the kernel code 34 executes before user programs. The monitoring program 9 sets protections at system start-up that make all user memory non-executable. Thereby, the first exit from kernel mode 72 will automatically cause a CPU exception. As part of handling this exception, the monitoring program 9 synchronizes the initial shadow GDT, LDT, and IDT with the corresponding tables in the kernel.

The next issue to be addressed is write-protecting the shadow tables and the critical page table entries, starting with the shadow tables. Note that, due to the lazy synchronization scheme, the shadow tables only need to be write-protected when the CPU 2 executes in user mode 70. The simplest way to do this may be to not map the shadow tables into the guest's address space at all (like is done for the SPT and the NPT). However, not mapping the shadow tables into the guest's address space increases the code size and complexity of the monitoring program 9 and also decreases performance. The preceding claim can be justified by the observation that if the shadow tables are not mapped into the guest's virtual address space then the monitoring program 9 will have to simulate every one of the many CPU 2 events in user space that access these tables. For example, hardware interrupts require the CPU 2 to read the address of the interrupt handler from the IDT. If the IDT is not mapped into the guest's virtual address space, the CPU 2 will generate a page fault. The monitoring program 9 could intercept this page fault to learn of the occurrence of the interrupt. Then, it would have simulated the delivery of the interrupt to the guest increasing the complexity and code size of the monitoring program 9.

To simplify the design of the monitoring program 9, the shadow tables may be mapped in the guest's virtual address space. The monitoring program 9 may use a contiguous range of virtual addresses in the guest's virtual address space in order to perform the this mapping. When the kernel boots, the monitoring program 9 requests the kernel to permanently allocate 256 Kbytes of contiguous virtual addresses within kernel memory for holding the shadow tables and to statically map this range of addresses of a contiguous range of guest physical addresses. In the discussion that follows, this region is called the shadow table area. The monitoring program 9 maintains the shadow GDT, LDT, and IDT in shadow table area and write-protects this area to prevent writes when the CPU 2 executes in user mode 70. The exact method the monitoring program 9 uses to write-protect the shadow table area depends upon whether it uses shadow paging or nested paging to virtualize physical memory.

Figure 10:
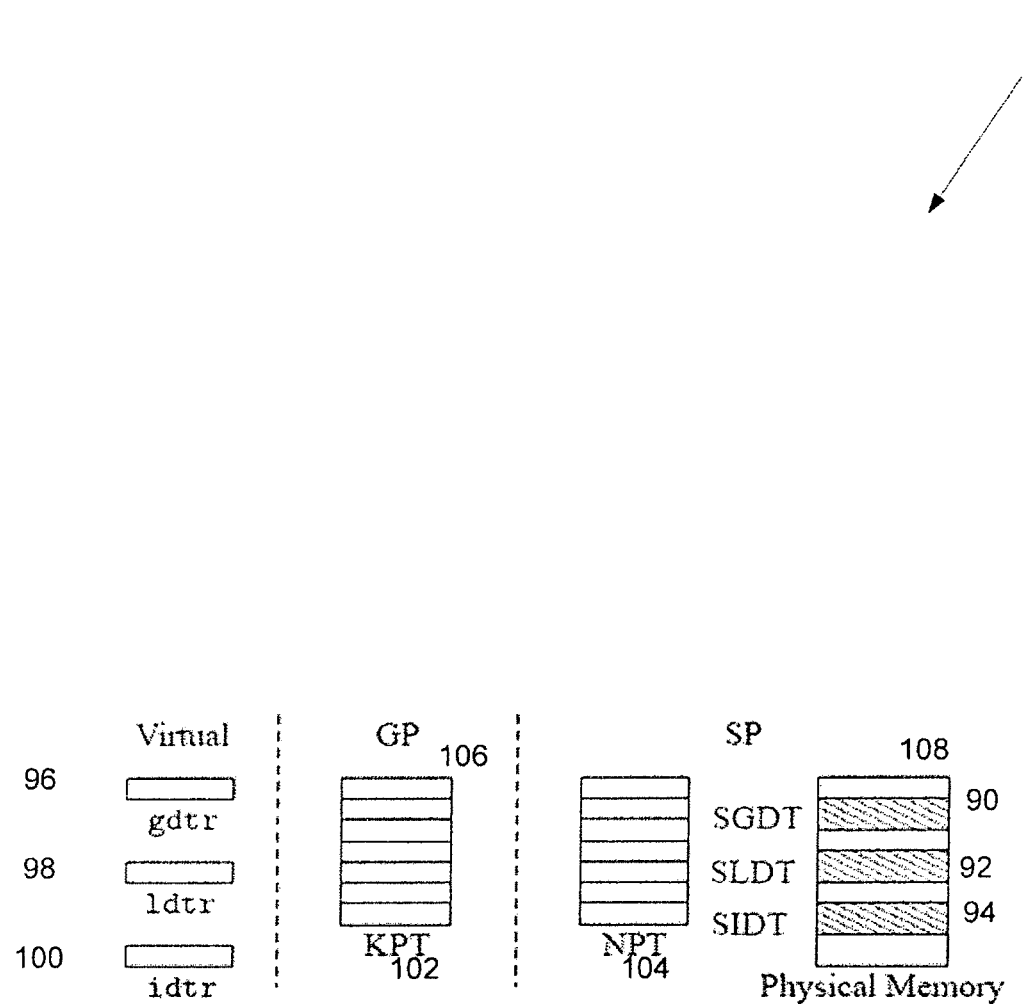
FIG. 10 illustrates a sequence of address translations required to access the GDT, LDT, and IDT.

FIG. 10 depicts a sequence of address translations required to access the GDT 90, LDT 92, and IDT 94 (SGDT, SLDT, and SIDT in the figure) using the virtual addresses stored in the gdtr 96, ldtr 98, and idtr 100. KPT 102 and NPT 104 are the kernel and nested page tables respectively. SP 108 refers to system physical address space and GP 106 to guest physical address space.

Figure 11:
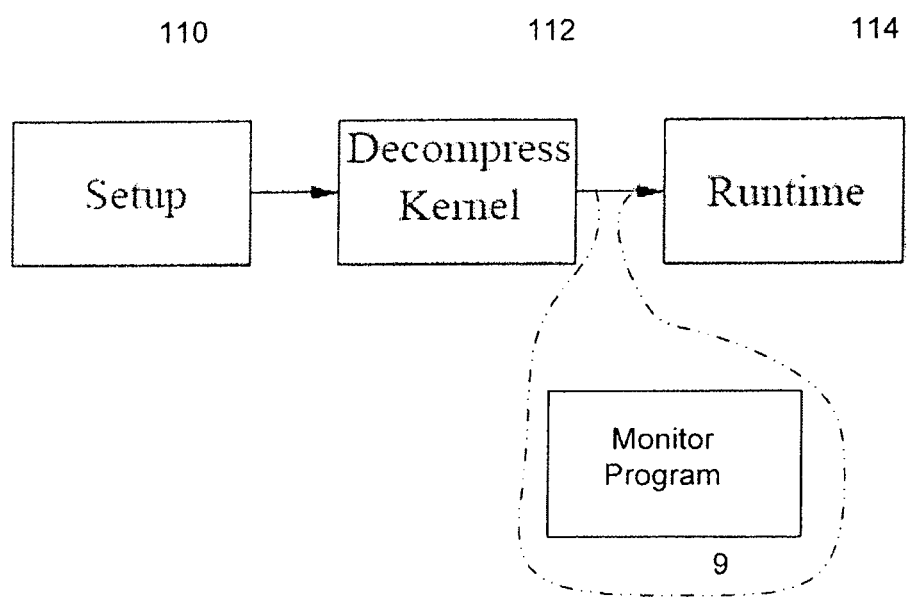
FIG. 11 illustrates the normal bootstrap sequence of the Linux OS as well as the modified bootstrap sequence including the monitoring program.

The critical page entries that should be write-protected depend on whether shadow or nested paging is used to virtualize physical memory. With shadow paging, the SPT are the only page tables used by the CPU. Therefore, the monitoring program 9 only needs to check the critical page table entries in the SPT because the SPT is inaccessible to the guest. With nested paging, the CPU uses both the kernel page tables (KPT) 102 and the NPT 104 for address translation, as shown in FIG. 11. In this case then, the critical page tables entries exist both in the kernel page tables 102 and in the NPT 104. The following discussion describes how the monitoring program 9 write-protects the shadow area and the critical page table entries with shadow paging. Then, a description follows of how the monitoring program 9 handles the case of nested paging.

With shadow paging, write-protecting the shadow area is straightforward: The monitoring program 9 sets up read-only mappings in the SPT entries that map the virtual address of the shadow table area to system physical addresses. Previously, it was noted that the guest to system physical address mapping is the identity map. Therefore, the monitoring program 9 fills the address field of the SPT entries mapping the shadow table area with the guest physical addresses of the shadow table area. Because the virtual and guest physical addresses of the shadow table area do not change during the system lifetime, the SPT entries for the shadow table area need to be set only once.

Protecting the critical page table entries is also simple because the SPT is inaccessible to the guest. The monitoring program 9 only needs to check if the critical page table entries are set up correctly in the SPT. In other words, the monitoring program 9 needs to check that all entry pointers translate to physical pages containing approved kernel code 34 and that virtual addresses of the gdtr, ldtr, and idtr to be used in user mode 70 translate to physical addresses of the shadow tables in the shadow area. The monitoring program 9 performs this check as part of its lazy synchronization scheme that synchronizes the shadow tables with the kernel's copies.

When using nested paging, the monitoring program 9 can write-protect the shadow table area by marking the corresponding guest physical pages read-only in the NPT 104 and by checking and protecting all the critical page table entries. In this case, the critical page table entries exist both in the kernel page tables and in the NPT 104. Because the NPT 104 exists in the monitoring program's memory and guest to system physical address mapping is an identity map, validating and write-protecting the critical page table entries in the NPT 104 is trivial.

To see how the monitoring program 9 protects the critical page table entries in the kernel's page table, observe that the CPU 2 accesses the kernel's page tables using guest physical addresses. Then, the kernel's page table could be protected from writes by user mode 70 software by removing the write permissions in the NPT entries for the guest physical addresses of the kernel's page tables. Also, the DEV bit vector needs to protect the physical pages that contain the kernel's page table from DMA writes. Adopting this approach potentially requires that the NPT 104 used for user mode execution and the DEV bit vector be modified on each context switch because the page tables of each user process could use different physical pages. Modifying the NPT will require the TLB to be flushed. Modifying the DEV bit vector will require the invalidation of DEV cache in the memory controller. This invalidation requires software to set a bit in the DEV configuration registers and monitor the bit until it is cleared by the hardware. The clearing of the bit indicates that the hardware has invalidated the DEV cache. For performance, it is preferred to avoid performing several memory writes to the NPT, a TLB flush, and a DEV bit vector modification in the monitoring program 9 on each context switch.

An alternate option is to copy the critical entries in the kernel's page table into the shadow table area. Because the shadow table area exists at the same guest physical address, and hence system physical address, for the entire lifetime of the system both the NPT and DEV bit vector protections need to be set only once. However, this solution might also requires several memory writes due to the multilevel page table hierarchy of the x86. In view of the multi-level page table hierarchy, the monitoring program 9 needs to protect the page tables at all levels of the hierarchy that translate the virtual addresses of the shadow table area or the entry pointers to physical addresses. This could require several page tables to be copied into the shadow table area to write-protect all critical page table entries. Note that one need not copy the entire kernel page table. To understand why this is true, observe that a page table describes a function between virtual and physical addresses. Therefore, given virtual address corresponds to exactly one entry in a page table at each level of the page table hierarchy. Copying and protecting these page tables is sufficient to protect the critical page table entries.

For the Linux kernel, entry pointers point into the main kernel code segment. The main kernel code segment is mapped using pages that are 2 MB or 4 MB in size, depending upon whether or not PAE mode is being used. In non-PAE mode, the CPU uses a two level page table hierarchy. A 4 MB page is mapped by a single entry in the first level page table. Therefore, in non-PAE mode the amount of data that needs to be copied into the shadow table area to protect the critical page table entries reduces to the first level page table (4K) and one second level page table that translates the virtual addresses of the shadow table area (4K). Then the total amount of data copied in non-PAE mode comes to 8K. Note that the second number assumes that the shadow table area, which is 256K in size, will be mapped by one second level page table. In non-PAE mode paging a second level page table can map up to 4 MB of memory. As far as the start address of the shadow table area is aligned so that it occupies only addresses translated entirely by one second level page table, copying one page table at the second level should be sufficient. The Linux kernel allocates memory for the shadow table area with this restriction in mind.

In PAE-mode, the CPU uses a three level page table hierarchy. The main Linux kernel mode segment is mapped using a 2 MB page. This mapping uses two first two levels of page tables. The shadow table area uses all three levels of page tables. Then, in worst case, the amount of data to be copied to protect the critical page table entries in PAE-mode is the first level page table (32 bytes) and the second level page table (4K) for the entry pointers, and one second level page table and one third level page table (4K). The worst case total in this case is 12K+32 bytes. Note that as with the non-PAE case this assumes that the shadow table area will be mapped by a single third level page table. Because a third level page table in PAE mode can map up to 2 MB of memory this assumption is justified.

In summary, to protect the critical page table entries in the kernel's page tables, the monitoring program 9 copies the relevant page tables in all levels of the page table hierarchy into the shadow table area. The guest physical addresses of the shadow table area are marked read-only in the NPT and the system physical pages of the shadow table area are protected from DMA writes. The monitoring program 9 also modifies the guest's cr3 for user mode execution to point to the top-level page table in the shadow table area and modifies the pointers in the page table entries at all levels of the page table hierarchy to use the copies in the shadow table area. Note that only a few pointers per level of the page table hierarchy need to be modified.

Now that it is guaranteed that the kernel's page table will correctly map the virtual addresses of the shadow table area and the virtual addresses of the entry pointers to guest physical addresses of the shadow table area and the guest physical addresses of the approved code pages respectively, and the guest physical addresses of the shadow table area are marked read-only in the NPT 104, and the system physical pages of the shadow table area are protected against DMA writes, the shadow GDT, LDT, and IDT cannot be modified during user mode 70 execution. Recall that the monitoring program's lazy synchronization code sets the gdtr, ldtr, and idtr to the virtual addresses of the shadow tables and that the MSR-based entry pointers contain the correct virtual addresses. This means that all entry pointers will correctly refer to physical pages containing approved kernel code 34 during user mode execution, thereby satisfying property P1.

Porting the Linux Kernel

In this section is a discussion of how to port the Linux kernel to the monitoring program 9, by illustrating how the monitoring program 9 handles the two kinds of code that can be loaded into kernel memory: the main Linux kernel which is loaded at bootstrap, and the kernel modules which are dynamically loaded and unloaded during the lifetime of the system.

Main Kernel

The main kernel makes calls to the BIOS code as part of its initialization. Because the BIOS code executes in Ring 0, the monitoring program 9 would have to approve the BIOS code. However, approving the BIOS code is not simple because of the diversity and complexity of the BIOS subsystem. For example, some BIOS code only map a part of the Flash chip containing the BIOS image into the physical address space of the CPU. Others map their code into several different regions of physical memory whose locations might differ from system to system. Approving the BIOS code could add considerably to the code size and complexity of the monitoring program 9.

Fortunately, the Linux kernel is designed so that after its initialization, it does not make any more calls to the BIOS code. Even more conveniently, the main kernel's code is divided into two parts: the bootstrap part which contains all the calls to the BIOS code and the runtime. In view of this, by launching the monitoring program 9 after the bootstrap finishes execution the monitoring program 9 does not have to deal with the BIOS code at all.

FIG. 11 shows the normal bootstrap sequence of the Linux OS. The bootloader loads the kernel into memory and jumps to the kernel's bootstrap code. The kernel's bootstrap code consists of two parts: a setup function 110 and a decompress_kernel function 112. The setup function 110 executes first and initializes the hardware with calls to the BIOS. It then jumps to the decompress_kernel function 112, which performs further hardware initialization, decompresses the runtime, and jumps to start address of the runtime 114.

This boot sequence may be modified to make decompress_kernel 112 invoke the monitoring program 9 via the skinit instruction (the bootloader loads the monitoring program 9 into memory along with the kernel) as shown in the dotted area of FIG. 11. A late launch feature of skinit ensures that the monitoring program 9 will now execute untampered by any entity on the system decompress_kernel 112 also passes the start and end addresses of the runtime's code segment as parameters to the monitoring program 9. The monitoring program 9 then performs its initialization and passes the runtime image to the approval policy for approval.

In the current implementation, an approval policy is utilized based on a whitelist of cryptographic hashes. The approval policy computes a SHA-1 hash of the kernel runtime, and approves the runtime if the hash exists in the whitelist. Upon approval, the monitoring program 9 creates a VMCB whose CPU state is set to the state of the CPU at the time when the runtime starts executing during a normal bootstrap. Finally, the monitoring program 9 sets memory protections over the runtime code, and transfers control to the runtime 114 using the vmrun instruction.

A few additional issues in the above implementation should be addressed. One is the issue of validating the start and end addresses of the main kernel code image passed by the decompress_kernel function 112. This can be simply handled by noting that if the start and end addresses passed to the monitoring program 9 are different from their correct values, then the main kernel code image should differ from its expected value, and should be rejected by the approval policy.

The second issue is that it is impossible, under the W exclusive-or X protection scheme, to set suitable protections for pages that contain both code and data. To address this issue, the kernel linker script is modified to ensure that start addresses of all data segments of the runtime are page aligned.

Kernel Modules

The main issue with modules is that the module loading code in the kernel relocates the module executable to link it with the kernel. The module image will look different after the relocation than before. Because the load address of a module can vary each time it is loaded and can vary between systems, it is impractical to create an approval policy to deal with all possible load addresses of all possible modules on every system. It is also not safe to approve the module code image before relocation by the kernel. Now the kernel will modify the module code image after approval and it is difficult to verify that the kernel's writes are not malicious.

One solution to the above problem is to have the monitoring program 9 perform the relocation after subjecting the module to approval by the approval policy. The kernel informs the monitoring program 9 of the virtual addresses from which the module will execute. As will be later discussed, the increase in the monitoring program's code size due to the addition of the relocation code is small.

Kernel modules can be loaded and unloaded dynamically. Therefore, the monitoring program 9 needs to set protections over module code on a module load and remove these protections on a module unload.

Figure 12:
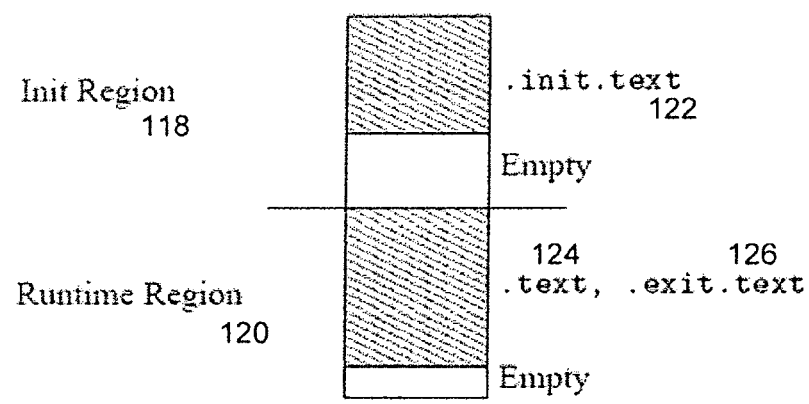
FIG. 12 illustrates the layout of different module sections in memory.

FIG. 12 depicts the layout of different module sections in memory. In FIG. 12, it is assumed that the Init Region 118 and the Runtime Region 120 are both less than one page in size. Both regions start at page aligned addresses and there is empty space between the end of the code and the end of the page.

Linux kernel module files on disk are relocatable object files in the Executable and Linkable Format (ELF) format. All module code is contained in three ELF sections: text 124, .init.text 122, and .exit.text 126. From the kernel source code, one can see that it puts .init.text 122 in one memory region and .text 124 and .exit.text 126 contiguously in another memory region. For the purposes of this description, the first memory region will be referred to as the init region 118 and the second memory region the runtime region 120. FIG. 12 shows how the module code is laid out. The figure shows the two regions 118, 120 as being contiguous pages in memory but this need not always be true. Finally, the kernel relocates the module code using the addresses of the two regions 118, 120 as inputs.

The control flow of the kernel's module loading code in the function load_module is modified so that it invokes the monitoring program 9 via a hypercall, after copying the module's code into the init 118 and runtime 120 regions. The arguments to the hypercall are the start and end addresses of the init 118 and runtime 120 regions (virtual addresses in shadow paging, and virtual and guest physical addresses in nested paging). On receiving the hypercall, the monitoring program 9 first calls the approval policy to check the module code. As with the main kernel any incorrect arguments to the hypercall will cause the approval check to fail. If the check passes, the monitoring program 9 relocates the module based on the arguments of the hypercall. Finally, the monitoring program 9 fills the empty space in the init 118 and runtime 120 regions with no-op instructions, sets memory protections over the two regions, and returns.

Unloading a module allows the kernel to reclaim the memory used. The free_module function in the kernel is modified to invoke the monitoring program 9 via a hypercall. The monitoring program 9 makes the pages occupied by the code pages of the module writable by the CPU 2 and peripheral devices and removes their execute permission. This prevents any further execution of the module code.

Evaluation

The following is a discussion of the evaluation of a monitoring program prototype focusing on compliance with design requirements and performance.

Design Requirements Compliance

As was noted previously there are at three design goals for the monitoring program 9: (1) small code size, (2) minimal kernel interface, and (3) ease of porting OS kernels. The first two goals aid in achieving better security, and the third goal simplifies deployment. The following is a discussion of how a prototype complies with these design goals.

D.A. Wheeler's sloc program is used to count the number of lines of source code in the monitoring program prototype. The results are presented in FIG. 13. For the purpose of measurement, the monitoring program's code is divided into four parts. The first part is the initialization code initializes the CPU state and the monitoring program's runtime state after the monitoring program 9 is invoked by the decompress_kernel function using the skinit instruction. The memory occupied by this code is made available for use by the kernel once the monitoring program's runtime code gains control. The debug code part provides a printf function, which is not required on a production system. The C language header part has both declarations as well as code in the form of preprocessor macros and functions. Finally, the runtime code part is responsible for providing the guarantee of approved kernel code execution. The code sizes for shadow paging and nested paging implementations are reported separately. Also shown in FIG. 13 are the code sizes of the SHA-1 function the monitoring program 9 uses for its approval policy, and the ELF relocation code for the kernel modules.

As can be observed from FIG. 13, the total size of the nested paging implementation of the monitoring program 9 is 3526 lines of C and assembler code. Of this, the security-sensitive runtime code and the header files measure 2328 lines. When the declarations (which mainly consist of various constants and large struct declarations) in the header files are removed from the previous count, the code size comes out to 1406 lines. For the shadow paging implementation, the total code size is 4092 lines of C and assembler code, with the security-sensitive runtime code and header files measuring 2955 lines. Upon removing the declarations from the count 2033 lines of code remain. These code sizes should put the monitoring program 9 within the reach of formal verification and manual audit techniques.

The monitoring program's 9 interface to the kernel consists of only 2 hypercalls. The first hypercall is used by the kernel to request changes to its code (such as loading and unloading modules), while the second hypercall is used by the kernel during its initialization to pass the virtual and guest physical addresses of the shadow table area. The hypercall interface is small which reduces the attack surface available to the attacker through the kernel. Also, the parameters passed in each hypercall are well-defined, making it possible for the monitoring program 9 to ensure the validity of these arguments.

The monitoring program's 9 design makes very few assumptions about the kernel which it protects. The following discusses changes that were made to the Linux kernel to port it to the monitoring program 9. Following that is a discussion of the kernel specific assumptions that the monitoring program 9 makes and discuss how those assumptions affect the effort required to port a new kernel.

Three changes were made to the Linux kernel version 2.6.20 to port it to the monitoring program 9. First, the decompress_kernel function invokes the monitoring program 9 using the skinit instruction instead of jumping to the decompressed kernel. Second, during its initialization, the kernel passes the addresses of the shadow table area to the monitoring program 9 using a hypercall. Finally, the control flow of the load_module and the free_module function is changed. As part of changing the control flow of these functions, the ELF relocation code is removed from the load_module function and added hypercalls to both functions. In all, the three changes added a total of 12 lines of code to the kernel and deleted 81.

The monitoring program 9 makes three assumptions about the kernel it protects. First, it assumes that the user 70 and kernel 72 mode share address spaces. If a kernel design uses separate address spaces for user 70 and kernel 72 modes, then the design of the shadow paging and nested paging code in the monitoring program 9 would need to be adapted. However, the changes are relatively small because one would only need to maintain separate page tables for user mode 70 and kernel mode 72, and handle the page faults that arise when the kernel tries to access user memory. Second, the monitoring program 9 assumes that the kernel's binary does not have pages that contain both code and data. Even if a kernel binary does not satisfy this requirement, it should be relatively easy to fix by appropriately modifying the linking of the kernel. Third, in order to not deal with the BIOS, the monitoring program 9 requires that the kernel not make any BIOS calls after its initialization. Kernels that do not satisfy this assumption will be relatively difficult to port to the monitoring program 9 without adding support in the monitoring program 9 for dealing with the BIOS code.

Performance Measurements

The following is a report of the performance of the SPT-based monitoring program 9 implementation and a comparison to Xen™ and the Linux kernel.

The experimental platform is the HP Compaq dc5750 Microtower PC. This PC uses an AMD Athlon64 X2 dualcore CPU running at 2200 MHz, and has 2 GB RAM. The monitoring program 9 allocates 1536 MB of RAM to the kernel in the experiments. The PC runs the i386 version of the Fedora Core 6 Linux distribution. The uniprocessor versions of Linux kernel 2.6.20 and Xen™ 3.0.4 are utilized. All Xen™ experiments execute in dom0. The experiments consist of kernel microbenchmarks and application benchmarks.

The lmbench benchmarking suite is used to measure overheads of different kernel operations when using the monitoring program 9. The monitoring program 9 adds overhead to kernel operations in three ways: (1) by modifying execute permissions in the SPT on each transition between user 70 and kernel 72 mode, (2) by synchronizing the SPT with the kernel's page table, and (3) by shadowing the GDT, LDT, and IDT. A subset of the process, memory, and context switch microbenchmarks from lmbench is used to study these overheads.

FIG. 14 shows the execution times of lmbench process and memory microbenchmarks. All times are in microseconds. PF stands for page fault and UP for uniprocessor. The Null Call shows the overhead of a round trip between user 70 and kernel mode 72 and back, i.e., it shows the overhead of (1) and (3) above. The Prot Fault indicates the time taken by the kernel to process a write access violation. The overhead is quite close to that of Null Call because it also only involves a round trip from user 70 to kernel 72 mode and back, from the perspective of the monitoring program 9. The overhead of Page Fault is higher than that of Prot Fault because handling a page fault requires a round trip from user mode 70 to kernel mode 72 and back, in which the kernel updates its page table, followed by a round trip from user 70 mode to the monitoring program 9 and back, in which the monitoring program 9 synchronizes the SPT with the kernel's page table. The Fork and Exec microbenchmarks incur all three sources of overhead.

To obtain an understanding of how much each of the three sources of overhead contribute to the overall overhead, further experiments were conducted. For these experiments, two additional versions of the monitoring program 9 were implemented: one that only virtualizes physical memory using the SPT, and the other that modifies the execute permissions of user and kernel memory in addition to virtualizing physical memory. These implementations isolate the overheads of the three sources.

FIG. 15 shows the breakdown of the monitoring program 9 overheads in the lmbench process and memory microbenchmarks. SPT stands for shadow page tables, Perm for modifying execute permissions on user and kernel memory. From comparing the first and second rows of this table it is clear that modifying the execute permissions for user and kernel memory drastically increases the overhead in all benchmarks. Also, by comparing the last row of FIG. 15 with the last row of FIG. 14 is it clear that shadowing the GDT, LDT, and IDT is a much lower overhead operation than modifying the execute permissions.

FIG. 16 shows the results of running lmbench context switch microbenchmarks. The context switch incurs the overhead of all three sources, leading to significant slowdown in the monitoring program 9 compared to the native Linux kernel and Xen™.

It is hypothesized that when the monitoring program 9 is used, the overhead of an application will be directly proportional to both the number of times the application calls the kernel and the rate of change of the application's working set. Kernel calls and returns will impose the overhead of switching execute permissions in the SPT and shadowing the GDT, LDT, and IDT, while a change of the working set will impose the overhead of SPT synchronization. Based on the hypothesis, compute-bound applications that have a stable working set throughout their lifetime will have the lowest overhead. On the other hand, I/O bound applications with highly variable working sets will be the pathological cases.

To test this hypothesis, both compute-bound and I/O bound applications were executed with the monitoring program 9.

For the compute-bound applications benchmarks were chosen from the SPECint 2006 suite. The I/O bound applications consist of the gcc benchmark from SPECint 2006, the Linux kernel compile, unzipping and untarring the Linux kernel sources, and Postmark.

In the Linux kernel compile, the sources of the kernel version 2.6.20 were compiled by executing "make" in the top-level source directory. For unzipping and untarring the kernel source "tar xfvz" was executed on the source tarball of the version 2.6.20 of the Linux kernel. For Postmark, 20000 files were chosen, 100000 transactions, and 100 subdirectories, and all other parameters are set at their default values. For comparison purposes, SPECint 2006 and each of these applications were executed on the native Linux kernel and on Xen™. Each of these applications was five times on each of the Linux kernel, Xen™, and the monitoring program 9.

Figure 17:
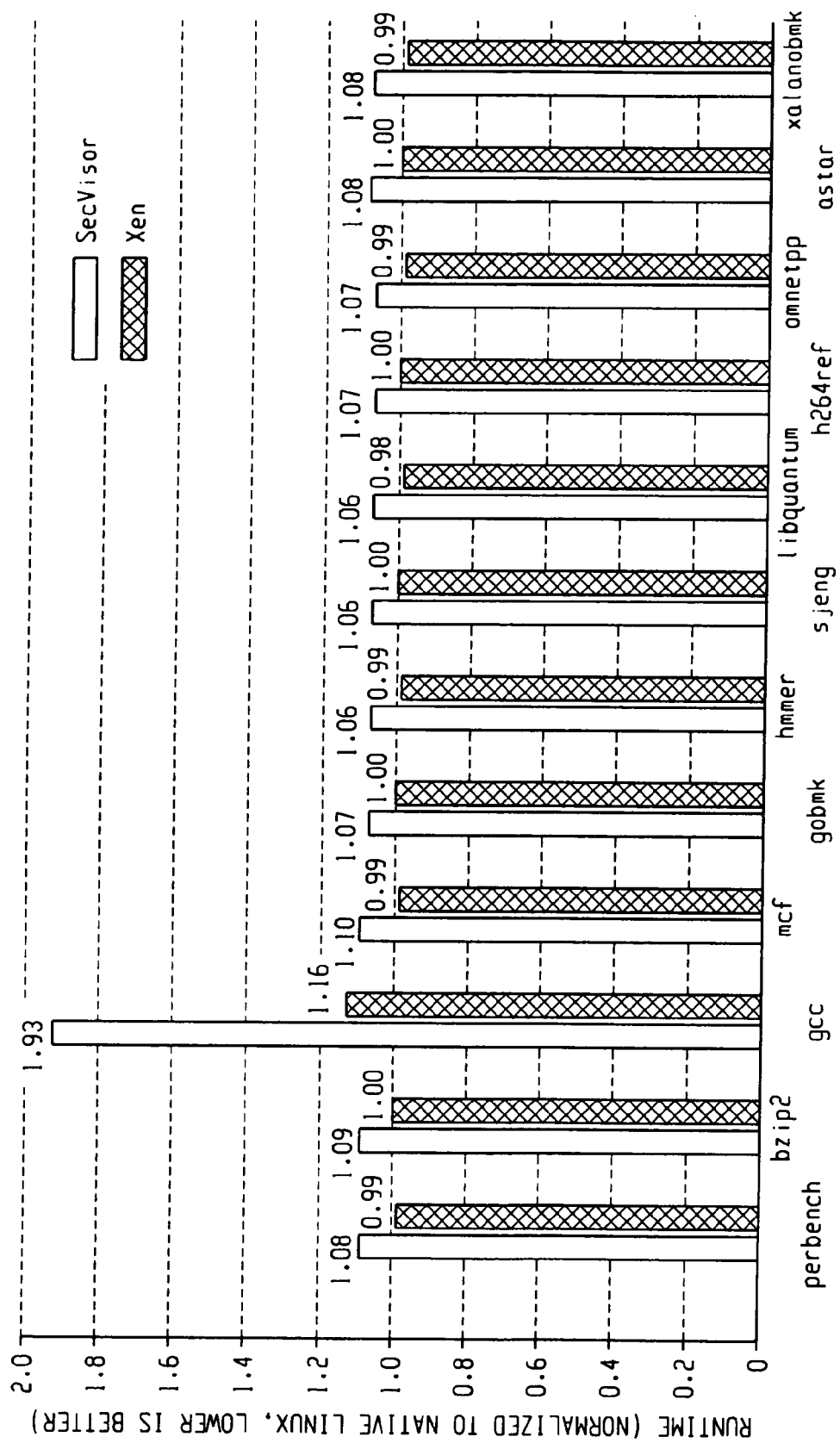
FIG. 17 illustrates the SPECint 2006 performance comparison between the monitoring program and Xen™, relative to the native Linux OS.
Figure 18:
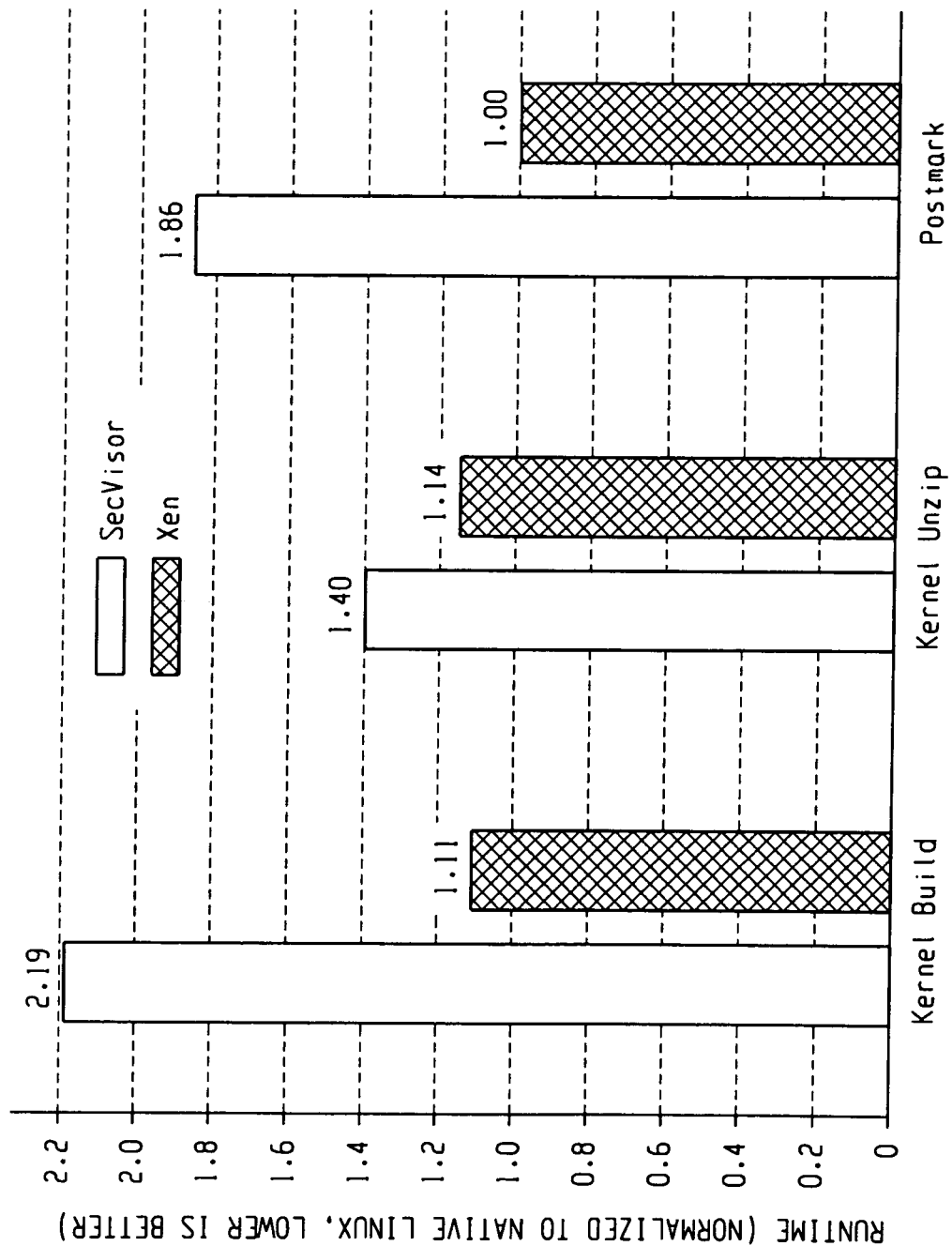
FIG. 18 illustrates an application performance comparison between the monitoring program and Xen™, relative to the Linux OS.

The results are presented in FIG. 17 and FIG. 18. FIG. 17 depicts the SPECint 2006 performance comparison between the monitoring program 9 and Xen™, relative to the native Linux OS. FIG. 18 depicts an application performance comparison between the monitoring program 9 and Xen™, relative to the Linux OS. The results are in line with the predictions: the compute-bound SPEC benchmarks have a low overhead while the gcc SPEC benchmark, kernel compile, and Postmark which are I/O bound and have rapidly changing working sets have the highest overheads.

Figure 19:
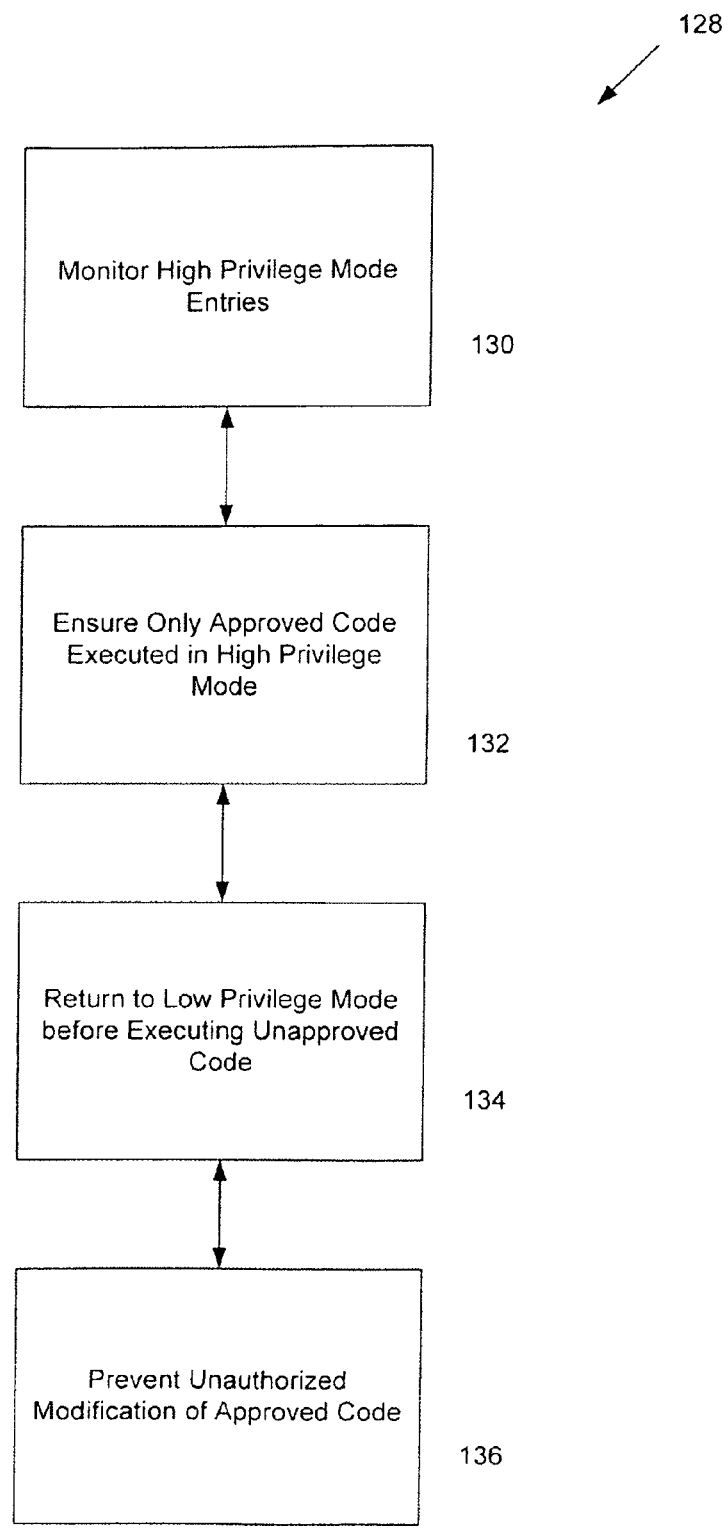
FIG. 19 is a block diagram of four properties to ensure security implemented by the disclosed monitoring program.
Figure 20:
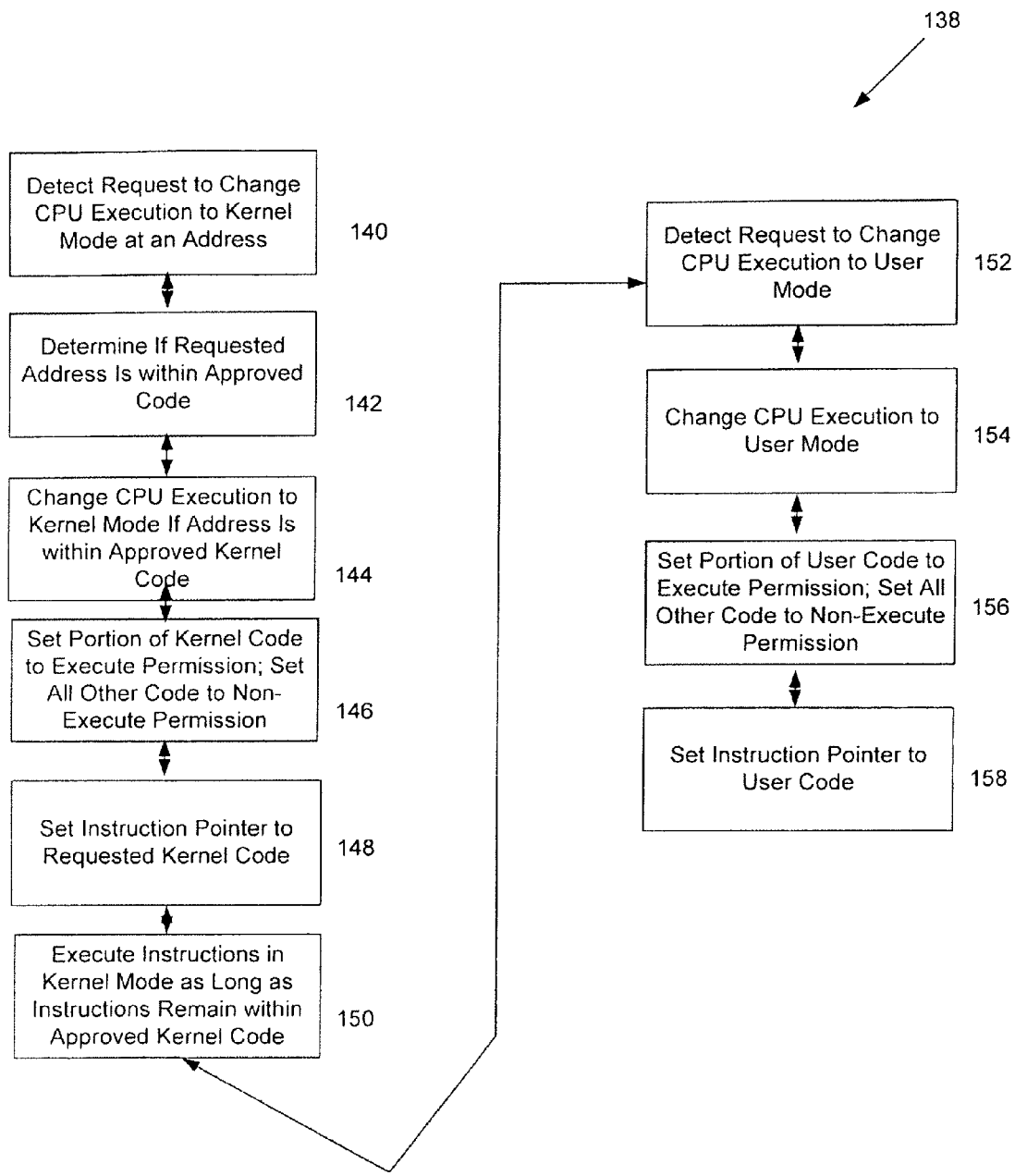
FIG. 20 is a block diagram of steps that may be implemented by the disclosed monitoring program for preventing the execution of unauthorized code.
Figure 21:
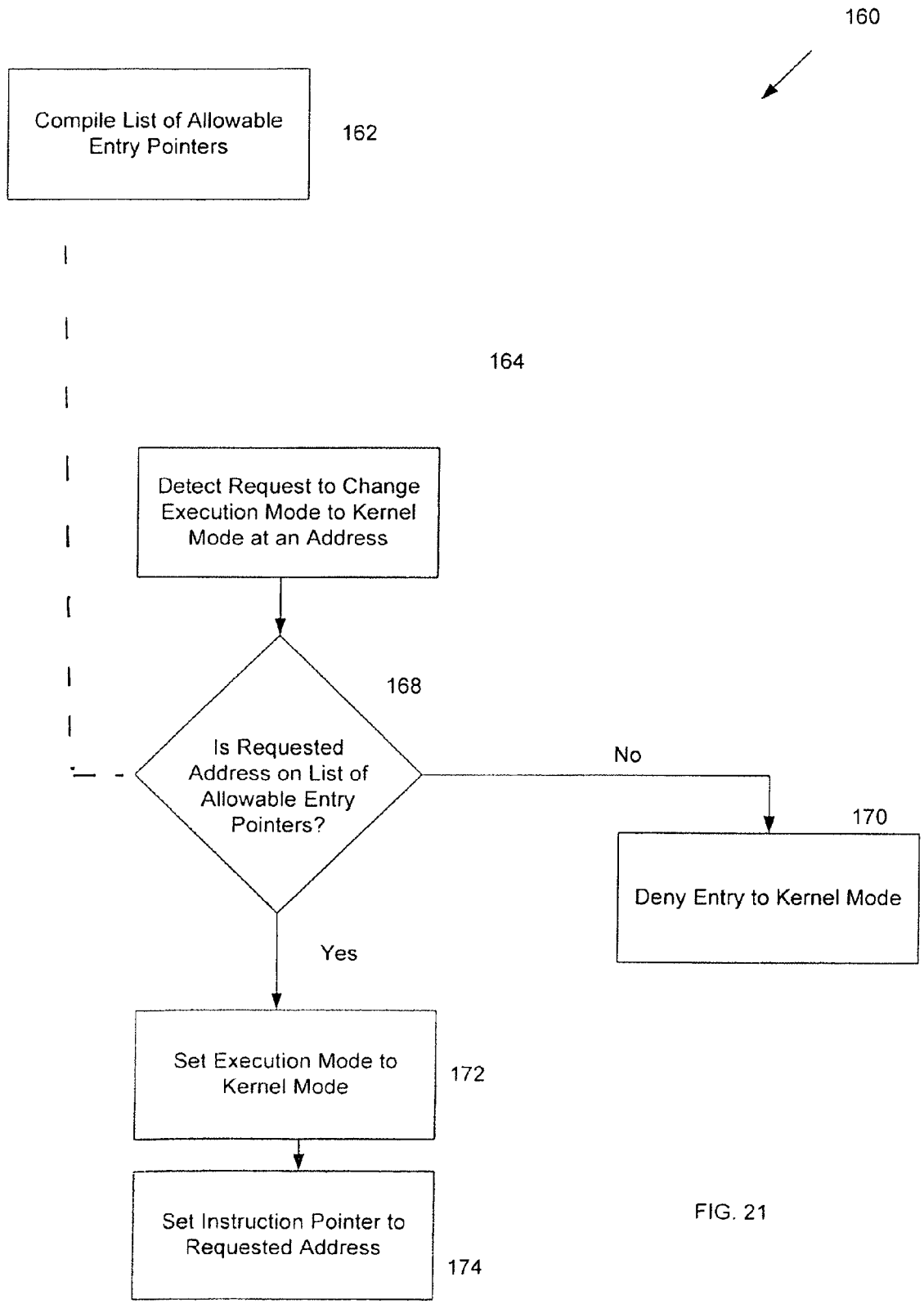
FIG. 21 is a block diagram of steps that may be performed by the disclosed monitoring program to determine whether a request to change the CPU execution to kernel mode is appropriate.

FIGS. 19-21 depict block diagrams for some methods associated with the monitoring program 9. FIG. 19 is a block diagram depicting the four properties 128 to be maintained for ensuring security as described in this disclosure. Step 130 requires the monitoring of high privilege mode entries to ensure that these entries are proper. Step 132 ensures that only approved code is executed while operating in a high privilege mode. Step 134 requires that the system return to low privilege mode before executing unapproved code, and step 136 prevents the unauthorized modification of approved code.

FIG. 20 is a block diagram depicting a process 138 that may be used for preventing the execution of unauthorized code. In step 140, a request to change the CPU execution mode to kernel mode at an address is detected. Step 142 then determines if the requested address is within approved code. If the address is in approved code, step 144 changes the CPU execution mode to kernel mode. Step 146 sets at least a portion of the kernel code to execute permission while setting all other code to non-execute permission. The instruction pointer is then set to the requested kernel code in step 148. Step 150 executes instructions in kernel mode as long as the instructions remain within kernel code. In step 152, a request to change the CPU execution mode to user mode is detected. When such a request is detected, the CPU execution mode is changed to user mode in step 154, at least a portion of user code is set to execute mode while all other code is set to non-execute permission in step 156, and the instruction pointer is set to the requested user code in step 158.

FIG. 21 is a block diagram depicting a process 160 for determining whether a request to change the CPU execution to kernel mode at an address is making the request to an appropriate address. Prior to runtime, a list of allowable entry pointers is compiled in step 162. Then, during runtime, a request to change the CPU execution mode to kernel mode at an address is detected in step 164. The requested address is compared to the compiled list of allowable entry pointers in step 168. The 'NO' branch of step 168 forwards the process to step 170 denying entry to kernel mode if the requested address is not on the list of allowable entry pointers. The 'Yes' branch forwards the process to step 172 setting the execution mode to kernel mode if the requested address is on the list. If the requested address is on the list of allowable entry pointers, the instruction pointer is then set to the requested address in step 174.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

What is claimed is:

1. A system for preventing unauthorized modification of an operating system, comprising:
    a processing unit;
    a system memory in communication with said processing unit;

an operating system for controlling the operation of said processing unit, said operating system comprised of kernel code; and an enforcement agent executing at a higher privilege than said kernel code, wherein the enforcement agent prevents unauthorized modification of existing kernel code and injection of new code with kernel privilege by maintaining shadow copies of a global descriptor table, a local descriptor table, and one or more registers, and by only permitting entry pointers contained within the global descriptor table, the local descriptor table, and the one or more registers to point to approved kernel code.

2. The system of claim 1, wherein said enforcement agent resides at a higher privilege level than said kernel code through virtualization.

3. The system of claim 1, wherein said enforcement agent resides at a highest processing unit privilege level in a host mode and the kernel code executes at the highest processing unit privilege level in a guest mode.

4. The system of claim 1, wherein said enforcement agent is configured to detect unauthorized modification of existing kernel code and injection of new code with kernel privilege from a virus, a worm, a buffer overrun, or a Trojan Horse.

5. The system of claim 1, wherein said enforcement agent comprises means for intercepting events that occur in the operating system.

6. The system of claim 5, wherein said means for intercepting is configured to intercept events from the group comprising instructions being run, operating system interrupts, operating system exceptions, inputs to the operating system, outputs from the operating system and changes to computer configuration settings.

7. A system for protecting the integrity of operating system code, comprising:

an enforcement agent, executing on one or more data processors, wherein the enforcement agent prevents unauthorized modification of operating system code and injection of new operating system code by maintaining shadow copies of a global descriptor table, a local descriptor table, and one or more registers, and by only permitting entry pointers contained within the global descriptor table, the local descriptor table, and the one or more registers to point to approved operating system code.

8. The system of claim 7, wherein said enforcement agent is configured to detect unauthorized modification of operating system code and injection of new operating system code from a virus, a worm, a buffer overrun, or a Trojan Horse.

9. The system of claim 7, wherein said enforcement agent comprises means for intercepting operating system events.

10. The system of claim 9, wherein said means for intercepting is configured to intercept events from the group comprising instructions being run, operating system interrupts, operating system exceptions, inputs to the operating system, outputs from the operating system and changes to computer configuration settings.

11. A method of protecting a computer which operates in a user mode and a higher privilege operating system mode, comprising:

requiring that all entries into the higher privilege operating system mode begin execution of approved operating system instructions by maintaining shadow copies of a global descriptor table, a local descriptor table, and one or more registers, and by only permitting entry pointers contained within the global descriptor table, the local descriptor table, and the one or more registers to point to approved operating system instructions;

executing only approved operating system instructions while in the higher privilege operating system mode;

switching to user mode before running non-approved instructions; and preventing unauthorized modification of approved instructions.

12. The method of claim 11, additionally comprising performing said requiring, executing, switching, and preventing at a privilege level higher than the privilege level of said operating system mode.

13. The method of claim 12, wherein said requiring includes intercepting operating system events and responding to the events.

14. A method of maintaining kernel code integrity in an operating system, comprising:

detecting a request that an execution mode be changed to kernel mode at an address;

determining whether said address is within approved kernel code by maintaining shadow copies of a global descriptor table, a local descriptor table, and one or more registers, and by only permitting entry pointers contained within the global descriptor table, the local descriptor table, and the one or more registers to point to approved kernel code;

setting said execution mode to kernel mode if said address is within approved kernel code;

setting an instruction pointer to said address if said address is within approved kernel code;

executing instructions in kernel mode as long as said instruction pointer remains within approved kernel code;

detecting a request that said execution mode be changed to user mode; and setting said execution mode to user mode upon detection of a request that said execution mode be changed to user mode.

15. The method of claim 14, wherein said determining further comprises:

comparing said address to a list of entry pointers; and determining that said address is within approved kernel code in response to said comparing.

16. The method of claim 15, wherein said comparing comprises comparing said address to a list of entry pointers containing pointer addresses associated with control transfer events to kernel mode for a particular architecture.

17. The method of claim 15, wherein said comparing comprises comparing said address to a virtualized copy of the list of entry pointers that are be operated on by a kernel.

18. The method of claim 15, wherein said comparing comprises comparing said address to a virtualized copy of the list of entry pointers that are modified by a kernel through safe function calls.

19. The method of claim 15, wherein said comparing comprises comparing said address to a virtualized copy of the list of entry pointers that are modified indirectly with shadow copies retained by a hypervisor.

20. The method of claim 19, wherein the comparing said address to a virtualized copy of the list of entry pointers that are modified indirectly utilize shadow copies visible to a CPU that are updated to match the virtualized copies if the hypervisor determines that the modification is proper.

21. The method of claim 15, wherein said comparing comprises comparing said address to a list of entry pointers containing pointer addresses associated with events that trigger CPU execution mode changes from user mode to kernel mode for a particular architecture.

22. The method of claim 14, wherein said detecting a request that an execution mode be changed at an address further comprises recognizing a CPU exception.

23. The method of claim 22, additionally comprising generating said CPU exception in response to a CPU attempting to execute kernel code that does not have an execute permission.

24. The method of claim 23, additionally comprising managing said execute permissions via page-table based protections or segmentation based protections.

25. The method of claim 14 wherein said setting said execution mode to kernel mode if said address is within approved kernel code further comprises setting kernel code permissions to execute and setting other memory permissions to non-execute.

26. The method of claim 22, additionally comprising generating said CPU exception in response to a CPU attempting to execute memory code that does not have execute permission.

27. The method of claim 14 further comprising preventing modification of approved kernel code by any peripheral without the approval of an enforcement agent.

28. A method of protecting a computer which operates in a user mode and a higher privilege operating system mode, comprising:
   requiring that all entries into the higher privilege operating system mode begin execution of approved operating system instructions by utilizing shadow page tables containing shadow copies of all existing entry pointers from a global descriptor table, a local descriptor table, an interrupt descriptor table, and one or more registers;
   executing only approved operating system instructions while in the higher privilege operating system mode;
   switching to user mode before running non-approved instructions by setting a CPU privilege level to Ring 3;
   preventing modification of the shadow global descriptor table, local descriptor table, and interrupt descriptor table during user mode execution; and
   preventing unauthorized modification of approved instructions.

29. The system of claim 1, wherein the shadow copies of the global descriptor table and the local descriptor table are synchronized with kernel copies of the global descriptor table and the local descriptor table, respectively, when the processing unit transitions from a kernel mode to a user mode.

30. The system of claim 7, wherein the shadow copies of the global descriptor table and the local descriptor table are synchronized with kernel copies of the global descriptor table and the local descriptor table, respectively, when the one or more data processors transition from a kernel mode to a user mode.

31. The method of claim 11, wherein the shadow copies of the global descriptor table and the local descriptor table are synchronized with kernel copies of the global descriptor table and the local descriptor table, respectively, when the computer transitions from the higher privilege operating system mode to the user mode.

32. The method of claim 14, wherein the shadow copies of the global descriptor table and the local descriptor table are synchronized with kernel copies of the global descriptor table and the local descriptor table, respectively, when the execution mode is changed from the kernel mode to the user mode.

33. The method of claim 28, wherein the shadow page tables containing the shadow copies of all existing entry pointers from the global descriptor table and the local descriptor table are synchronized with kernel copies of the global descriptor table and the local descriptor table, respectively, when the computer transitions from the higher privilege operating system mode to the user mode.

* * * * *